US011035298B1

(12) United States Patent
Jeng

(10) Patent No.: US 11,035,298 B1
(45) Date of Patent: Jun. 15, 2021

(54) TURBINE ENGINE SYSTEM

(71) Applicant: HELENG INC., Temple City, CA (US)

(72) Inventor: Jack Ing Jeng, Arcadia, CA (US)

(73) Assignee: HELENG INC., Temple City, CA (US)

( * ) Notice: Subject to any disclaimer, the term of this patent is extended or adjusted under 35 U.S.C. 154(b) by 0 days.

(21) Appl. No.: 17/067,143

(22) Filed: Oct. 9, 2020

Related U.S. Application Data

(60) Provisional application No. 62/990,181, filed on Mar. 16, 2020.

(51) Int. Cl.
| | | |
|---|---|---|
| F02C 9/26 | (2006.01) | |
| F01D 1/02 | (2006.01) | |
| F01D 17/02 | (2006.01) | |
| F02C 7/22 | (2006.01) | |
| F02C 7/266 | (2006.01) | |
| F01D 19/00 | (2006.01) | |

(52) U.S. Cl.
CPC ............... *F02C 9/26* (2013.01); *F01D 1/026* (2013.01); *F01D 17/02* (2013.01); *F01D 19/00* (2013.01); *F02C 7/22* (2013.01); *F02C 7/266* (2013.01)

(58) Field of Classification Search
CPC . F01D 1/026; F01D 5/141; F01D 7/00; F01D 17/00; F01D 17/02; F02C 7/22; F02C 9/16; F02C 9/26
See application file for complete search history.

(56) References Cited

U.S. PATENT DOCUMENTS

| | | | | |
|---|---|---|---|---|
| 2,013,087 A | * | 9/1935 | Cornell, Jr. | ............. F01D 1/026 415/119 |
| 2,304,136 A | * | 12/1942 | Woods | .................... F01D 1/026 60/39.49 |
| 6,798,080 B1 | | 9/2004 | Baarman et al. | |
| 2011/0033291 A1 | | 2/2011 | Moore et al. | |
| 2011/0194936 A1 | * | 8/2011 | Bender | ................. F03D 1/0608 416/124 |
| 2017/0089216 A1 | * | 3/2017 | Cui | ......................... F01D 5/147 |
| 2018/0023410 A1 | | 1/2018 | Lee | |

FOREIGN PATENT DOCUMENTS

| | | | | |
|---|---|---|---|---|
| DE | 3937910 | * | 11/1989 | ............... F03D 3/06 |
| KR | 101757600 B1 | | 7/2017 | |
| WO | 2013068977 A1 | | 5/2013 | |

OTHER PUBLICATIONS

English Translation of abstract of DE 3937910 (Year: 1989).*
International Search Report dated Apr. 28, 2021 for PCT Patent Application No. PCT/IB2021/050567.

* cited by examiner

*Primary Examiner* — Arun Goyal
(74) *Attorney, Agent, or Firm* — MLO, a professional corp.

(57) ABSTRACT

Disclosed is a system including a turbine having a plurality of spokes. The first spoke end is coupled to a shaft and the second spoke end is coupled to a blade of a plurality of blades. Each blade is a cup with an open surface. A dispenser includes a combustion chamber. An air injector is configured to inject air into the combustion chamber. A fuel injector is configured to inject fuel into the combustion chamber. An ignitor is configured to supply a spark for combustion in the combustion chamber. A nozzle directs discharged fluid toward the open surface of the blade to drive the turbine. A housing encloses the second nozzle end and the plurality of blades, and has an exhaust pipe. A controller is configured to control the air injector, the fuel injector and the ignitor.

15 Claims, 21 Drawing Sheets

TURBINE ENGINE SYSTEM

RELATED APPLICATIONS

This application claims priority to U.S. Provisional Patent Application No. 62/990,181 filed on Mar. 16, 2020 and entitled "Turbine Engine System," which is hereby incorporated by reference in full.

BACKGROUND

Power sources for producing power have evolved over time. Each design has trade-offs for managing power generation, thermal efficiency, energy efficiency, emission controls, pollution production, noise generation, resources consumed during operation, cost and aesthetics. For example, a typical piston-based combustion engine in a vehicle uses about 20-35% of the energy released by the fuel to move the vehicle due to energy losses such as friction, noise, air turbulence, and the work used to rotate engine components and other appliances. In another example, fossil fuel power plants burn fossil fuels, such as coal or natural gas, to produce electricity, and machinery converts the heat energy into mechanical energy which operates a generator. The power plant uses the energy extracted from expanding gas such as steam or combusted gas. The conversion methods have limited efficiency and produce unused heat and emissions such as $CO_2$, $SO_2$, NOx, and particulate matter. There are additional energy losses during the transmittal and distribution of the electricity.

SUMMARY

Disclosed is a system including a turbine having a plurality of spokes. The plurality of spokes are spaced circumferentially around a shaft. Each spoke has a first spoke end and a second spoke end, and each spoke extends along an axis between the first spoke end and the second spoke end. The first spoke end is coupled to the shaft and the second spoke end is coupled to a blade of a plurality of blades. Each blade is a hemispherical-shaped cup with an open surface and coupled to the second spoke end with the open surface at a −20° to 75° angle to the axis. A dispenser includes a combustion chamber. An air injector is coupled to the combustion chamber and configured to inject air of an air-fuel mixture into the combustion chamber. A fuel injector is coupled to the combustion chamber and configured to inject fuel of the air-fuel mixture into the combustion chamber. An ignitor is coupled to the combustion chamber and configured to supply a spark for combustion of the air-fuel mixture in the combustion chamber. A nozzle has a first nozzle end coupled to the combustion chamber and a second nozzle end positioned to direct discharged fluid after combustion in the combustion chamber toward the open surface of the blade to drive the turbine. A housing encloses the second nozzle end and the plurality of blades, and has an exhaust pipe extending away from the shaft configured to direct the discharged fluid out of the housing. A controller is in communication with the dispenser and configured to control the air injector, the fuel injector and the ignitor.

Disclosed is a system including a turbine having a plurality of blades being spaced circumferentially around a shaft. Each blade of the plurality of blades is a hemispherical-shaped cup with an open surface. Each dispenser of the plurality of dispensers is positioned facing the open surface of each blade, and is configured to direct discharged fluid toward the open surface of each blade to drive the turbine. A housing encloses the plurality of blades and a portion of each dispenser of the plurality of dispensers, and has an exhaust pipe extending away from the shaft configured to direct the discharged fluid out of the housing. A controller is in communication with the plurality of dispensers and configured to control the plurality of dispensers.

DETAILED DESCRIPTION

Disclosed is a turbine engine system that generates power by using an internal combustion engine design combined with rocket combustion theory. The system includes a turbine having a plurality of spokes and each spoke has a blade which may be a hemispherical-shaped cup with an open surface, and a plurality of dispensers. Each dispenser includes a combustion chamber where air and fuel are ignited then fluid, such as gas, is discharged out of the combustion chamber toward the blade of the turbine to move the turbine thus generating power. The turbine engine system may be coupled to other components such as a motor, generator, wheel, propeller or transmission system depending on the application. The turbine engine system may replace conventional power sources and provide power for various types of transportation devices such as a passenger vehicle, train, ship or aircraft. The size of the turbine engine system can be customized depending on the application. A plurality of turbine engine systems can be coupled to the same shaft for additional power generation, or the turbine engine system can be coupled to another power generator or a plurality of generators to generate a greater amount of power.

It is known in the art that some traditional power generation systems have efficiencies of only 20-30%. The turbine engine system improves the efficiency of the system up to 95% compared to traditional power generation systems. The turbine engine system reduces or eliminates complicated, heavy drivetrains, transmissions and other components of traditional power generation systems, and the turbine engine system has less components, a smaller footprint, weighs less, produces less emissions and is quieter than traditional power generation systems. The turbine engine system is designed to replace piston-based engines used in vehicles such as cars, trucks, trains, boats, ships and aircrafts by directly engaging to the drivetrain of the vehicle, the propeller and the alternator or generator. The turbine engine system can be implemented and configured at 0° to 90° for use in vertical take-off and landing aircrafts or ship propulsion steering systems, and can replace air independent propulsion engines for submarines.

In some embodiments, the turbine engine system may be implemented as a generator for home use or in a large capacity power plant/farm to generate a high volume of electricity. Using the turbine engine system as a power plant/farm eliminates the need for costly components such as transmission lines, poles, towers, transformers, switches, relays, and power distribution hubs. The energy distribution can be based on demand hence saving fossil fuel consumption while producing less pollution. This results in reducing the consumer electric bill significantly.

Figure 1A:
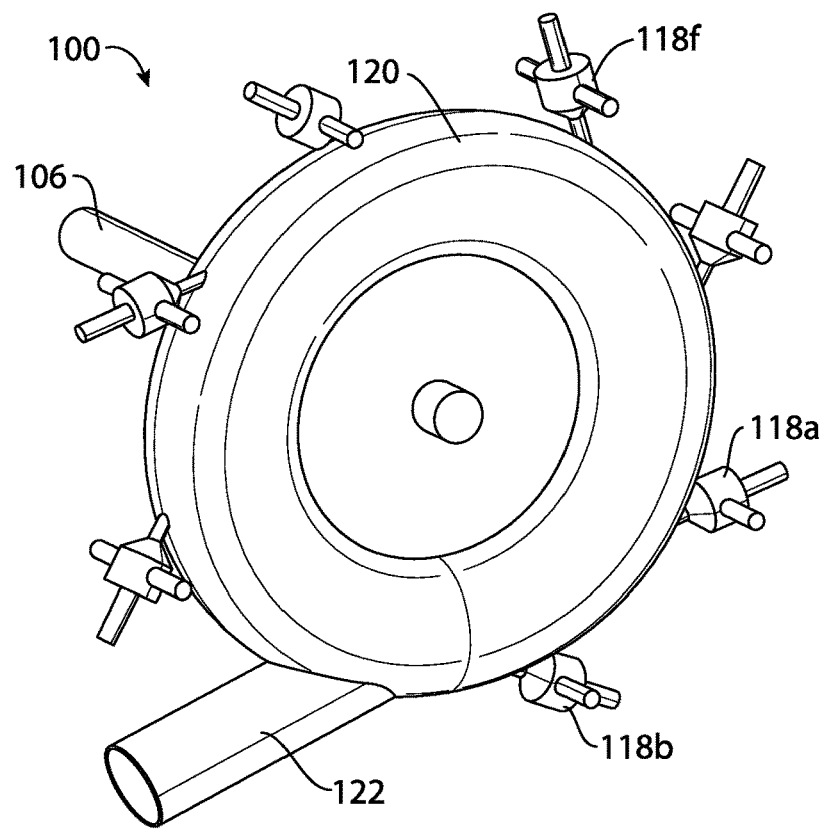
FIGS. 1A and 1B are perspective views of a turbine engine system, in accordance with some embodiments.
Figure 1B:
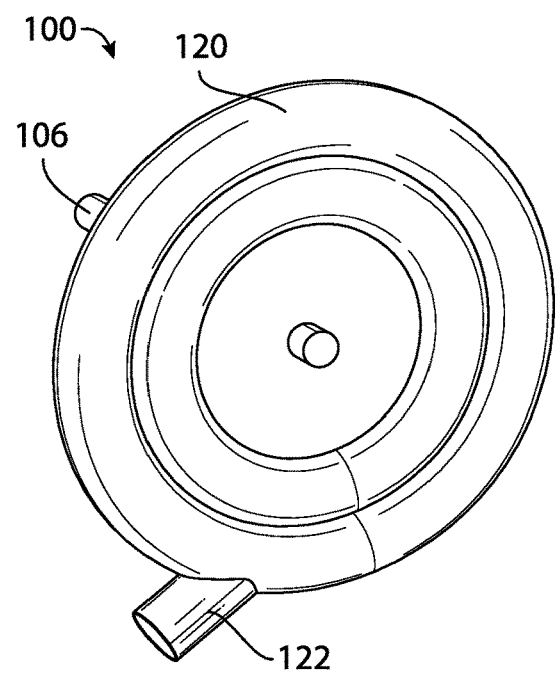
Figure 2:
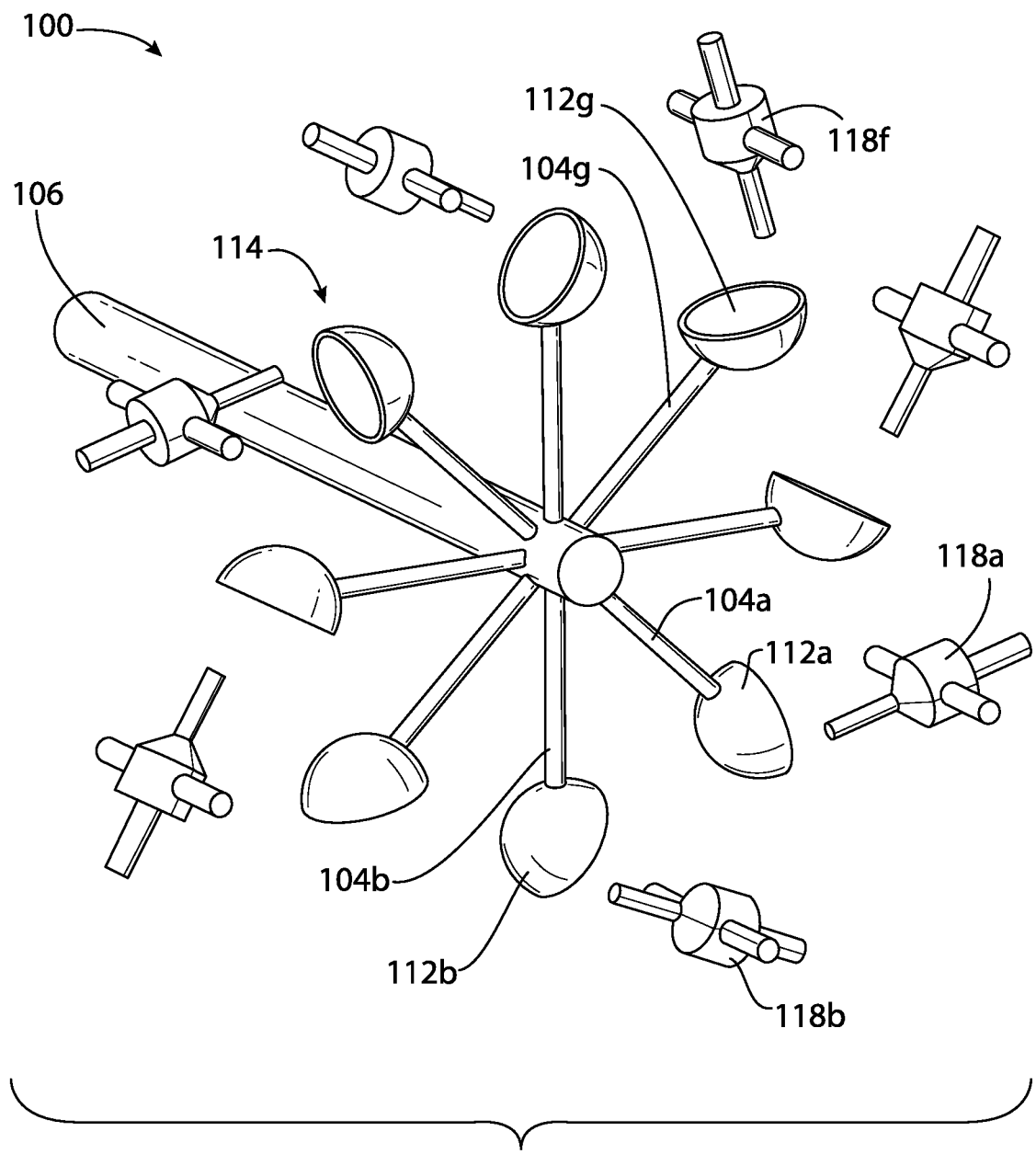
FIG. 2 is a perspective view of the turbine engine system with the housing removed.
Figure 3:
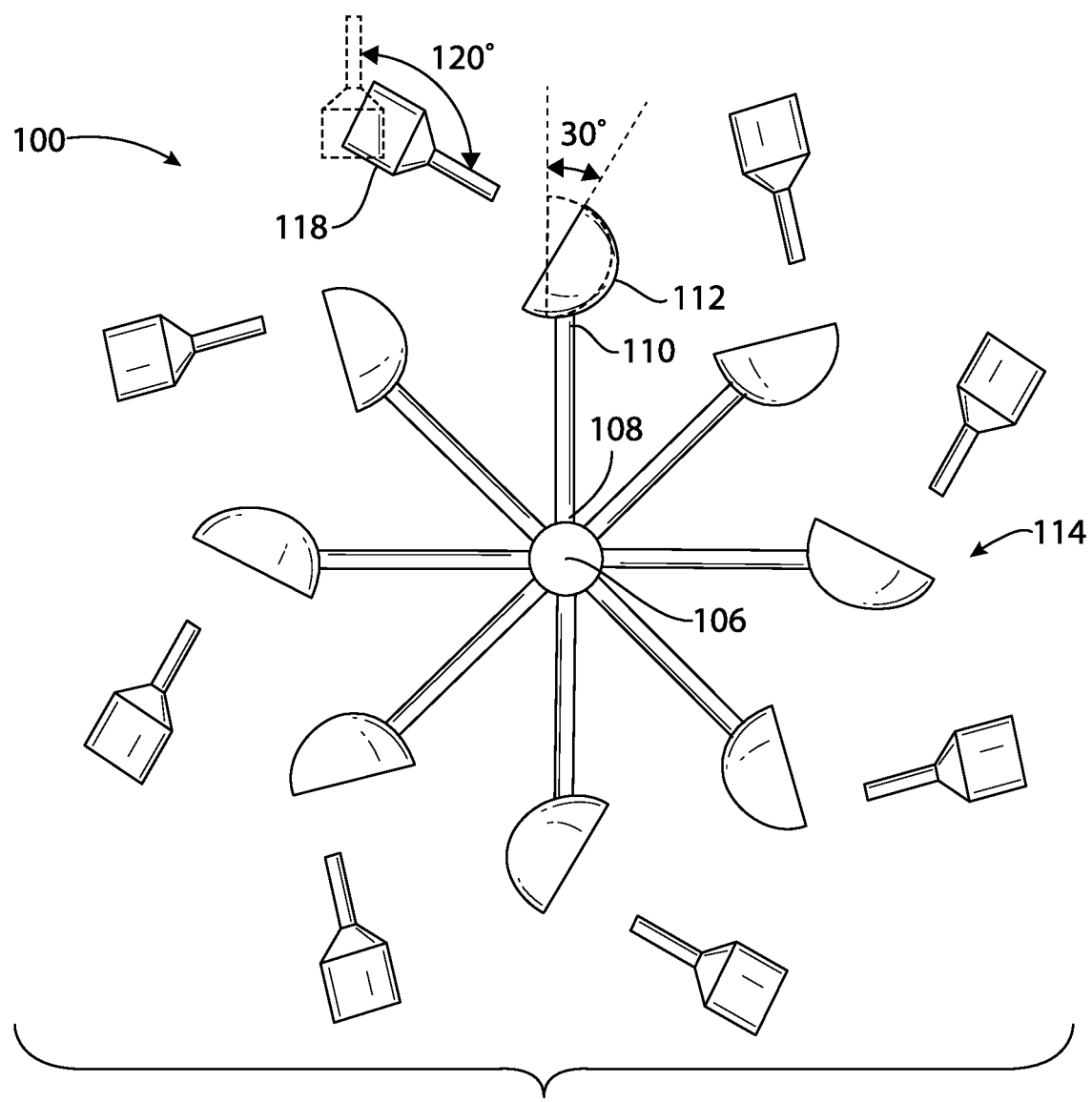
FIG. 3 is a front view of plurality of spokes of the turbine, in accordance with some embodiments.

FIG. 1A is a perspective view of a turbine engine system 100, in accordance with some embodiments, FIG. 1B is a perspective view of a turbine engine system 100, in accordance with some embodiments, and FIG. 2 is a perspective view of the turbine engine system 100 with the housing removed, such as FIG. 1A or FIG. 1B with the housing removed. The turbine engine system 100 has a plurality of spokes 104. Each of the plurality of spokes 104 may be designated as 104a, 104b, 104c . . . 104n. As shown, there are eight spokes 104 which is considered an 8-blade turbine design. The plurality of spokes 104 are spaced circumferentially around a shaft 106. The spacing of each of the plurality of spokes 104 may be evenly spaced, or spaced in a pattern such as spaced in pairs with more distance in between the pairs, or randomly spaced, or the like. In FIG. 3, each of the plurality of spokes 104 has a first spoke end 108 and a second spoke end 110, and the spoke 104 extends along an axis between the first spoke end 108 and the second spoke end 110. The first spoke end 108 is coupled to the shaft 106 and the second spoke end 110 is coupled to a blade 112 of a plurality of blades 112. Each of the plurality of blades 112 may be designated as 112a, 112b, 112c . . . 112n. Each of the plurality of blades 112 has a receiving face with an open surface such as a hollowed-out receptacle to catch and receive fluid. In some embodiments, each of the plurality of blades 112 is a hemispherical-shaped cup with an open surface. Other shapes are possible such as oval or elliptical. The shape of each of the plurality of blades 112 is designed to maximize the amount of fluid collected while considering drag coefficient in fluid dynamic theory. For example, the hemispherical-shaped cup blade 112 may have a drag coefficient of 0.42 and a blade 112 with an elliptical shape may have a drag coefficient of 0.04. The depth of the hemispherical-shaped cup with an open surface may be completely hollowed-out or may not be hollowed-out but only slightly concaved. The plurality of spokes 104 and the plurality of blades 112 are configured to rotate about the shaft 106 forming a turbine 114.

A plurality of dispensers 118 are mounted to the housing 120 and spaced circumferentially around the shaft 106. The spacing of each of the plurality of dispensers 118 may be evenly spaced, or spaced in a pattern such as spaced in pairs with more distance in between the pairs, or randomly spaced, or the like. Generally, the spacing of each of the plurality of dispensers 118 coordinates with the spacing of each of the plurality of spokes 104. Each of the plurality of dispensers 118 may be designated as 118a, 118b, 118c . . . 118n. Each of the plurality of dispensers 118 is configured to deliver fluid (e.g., liquid or gas) to each of the plurality of blades 112. Each of the plurality of dispensers 118 is generally positioned facing the open surface of each of the plurality of blades 112, and configured to direct discharged fluid toward the open surface of each of the plurality of blades 112 to drive or move the turbine 114.

Referring to FIG. 1A, a housing 120 encloses a portion of each of the plurality of dispensers 118, the plurality of blades 112, the plurality of spokes 104 and a portion of the shaft 106. Referring to FIG. 1B, in some embodiments, the housing 120 encloses all of the plurality of dispensers 118, the plurality of blades 112, the plurality of spokes 104 and a portion of the shaft 106. In this way, all of the plurality of dispensers 118 are located inside of the housing 120. This may be a one or two-piece design such that a first portion of the housing 120 encloses a portion of each of the plurality of dispensers 118, the plurality of blades 112, the plurality of spokes 104 and a portion of the shaft 106, and a second portion of the housing 120 encloses all of the plurality of dispensers 118, the plurality of blades 112, the plurality of spokes 104 and a portion of the shaft 106.

The housing 120 may be circular or toroidal or another suitable shape. In some embodiments, liquid coolant conduits (not shown) are coupled to the inside surface of the housing 120 and configured to dissipate heat in the discharged fluid after combustion in the combustion chamber 124 of each of the plurality of dispensers 118. An exhaust pipe 122 may be coupled to or integral with the housing 120, and may extend away from the shaft 106. The exhaust pipe 122 is configured to direct the discharged fluid out of the housing 120. The exhaust pipe 122 may include a muffler or a silencer system such as in firearm technology to reduce noise.

FIG. 3 is a front view of a plurality of spokes 104 of the turbine engine system 100, in accordance with some embodiments. Each of the plurality of blades 112 is coupled to the second spoke end 110 of each of the plurality of spokes 104 with the open surface at an angle to the axis (along the spoke 104, see dashed line). FIG. 3 shows each of the plurality of blades 112 at a 30° angle to each of the plurality of spokes 104. In this way, each of the plurality of blades 112 is apt to maximize the amount of fluid such as combusted gas received from each of the plurality of dispensers 118 depending on the application. In other embodiments, each of the plurality of blades 112 is at an angle to the spoke of −20° to 75° such as −15°, 0°, 15°, 20°, 30°, 40° or 60°. In some embodiments, each of the plurality of dispensers 118 may be positioned at a 120° angle to each of the plurality of spokes 104. The centerline of each of the plurality of dispensers 118 may be perpendicular to a portion of each of the plurality of blades 112 such as the receiving face of the open surface of the cup of each of the plurality of blades 112. The position of each of the plurality of dispensers 118 is designed to maximize the amount of fluid collected by each of the plurality of blades 112.

Figure 4A:
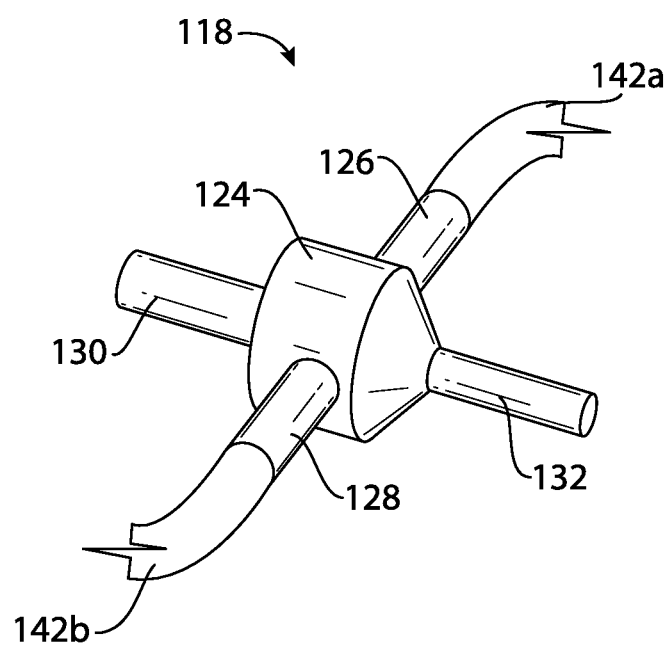
FIG. 4A is a perspective view of the dispenser of the turbine engine system, in accordance with some embodiments.

FIG. 4A is a perspective view of the dispenser 118 of the turbine engine system 100, in accordance with some embodiments. The design of the plurality of dispensers 118 is based on rocket combustion design technology. Conventionally, a piston engine only harvests the initial energy per ignition because when the piston stroke reaches the end, no more energy can be used to turn the shaft. Thus, a large percentage of the energy is lost in the impact of the stroke. Conversely, the turbine engine system 100 can harvest nearly 100% of the gas expansion energy because the turbine is in continuous rotation. Each of the plurality of dispensers 118 includes a combustion chamber 124 which may be a conical shape with a first, wider-shaped end and a second, narrower-shaped end such as a funnel. Other shapes are possible. An air injector 126 is coupled to the combustion chamber 124 and configured to inject air of an air-fuel mixture into the combustion chamber 124. A fuel injector 128 is coupled to the combustion chamber 124 and configured to inject fuel of the air-fuel mixture into the combustion chamber 124. An ignitor 130 such as a spark plug is coupled to the combustion chamber 124 and configured to supply an electrical spark for combustion of the air-fuel mixture in the combustion chamber 124. A nozzle 132 has a first nozzle end coupled to the combustion chamber and a second nozzle end positioned to direct the discharged fluid after combustion in the combustion chamber 124 toward the open surface of the blade 112 to move the turbine engine system 100. The shape of the nozzle may be linear as shown in FIG. 4A, or curved. The fuel injector 128 of the dispenser 118 injects the fuel into the combustion chamber 124 via hose 142b, and the air injector 126 of the dispenser 118 injects the air into the combustion chamber 124 via hose 142a.

The turbine engine system 100 is a nearly frictionless turbine with a rocket-based internal combustion engine. For example, the turbine engine system 100 may use a ball bearing between the stator and the rotator, and the coefficient of friction of the ball bearing may be 0.1 to 0.001. Reducing friction in the balls bearings reduces wear and facilitates extended use at high speeds. Additionally, reducing friction reduces the risk of overheating and premature failure of the ball bearing. These factors directly impact efficiency.

In some embodiments, the fuel is gasoline or liquified natural gas. For example, when gasoline is used, a 1.0 L piston-based combustion engine requires about 0.1 ml of gasoline mixed with an adequate volume of air or oxygen per explosion. The ratio of gasoline to air may be 14.7:1 by mass (weight). After the ignition by, for example, the spark plug, the gasoline and air mixture explodes and generates up to 1,500° C. of heat. According to thermal expansion and gas laws, for every 100° C. incremental, the gas volume expands by 33%, so at 1500° C., the hot air volume increase 51.2 times such as $1.3^{15}=51.186$. In other words, for every 0.1 ml of gasoline exploded, there is 46.5 L (or 0.1×0.755 (gasoline weight)×14.7×51.2/1.225 (air density)=46.4873 L gas volume at normal temperature. In the present embodiments, the nozzle 132 coupled to the combustion chamber 124 directs the hot air—or discharged fluid—after combustion in the combustion chamber 124 toward the open surface of each of the plurality of blades 112 to drive the turbine 114 of the turbine engine system 100. The discharged fluid exits the combustion chamber 124 at a high speed similar to a fire engine dispensing high-pressure water. The discharged fluid contacts and pushes or moves each of the plurality of blades 112 of the turbine 114 and causes each of the plurality of blades 112 to rotate about the shaft 106.

Figure 4B:
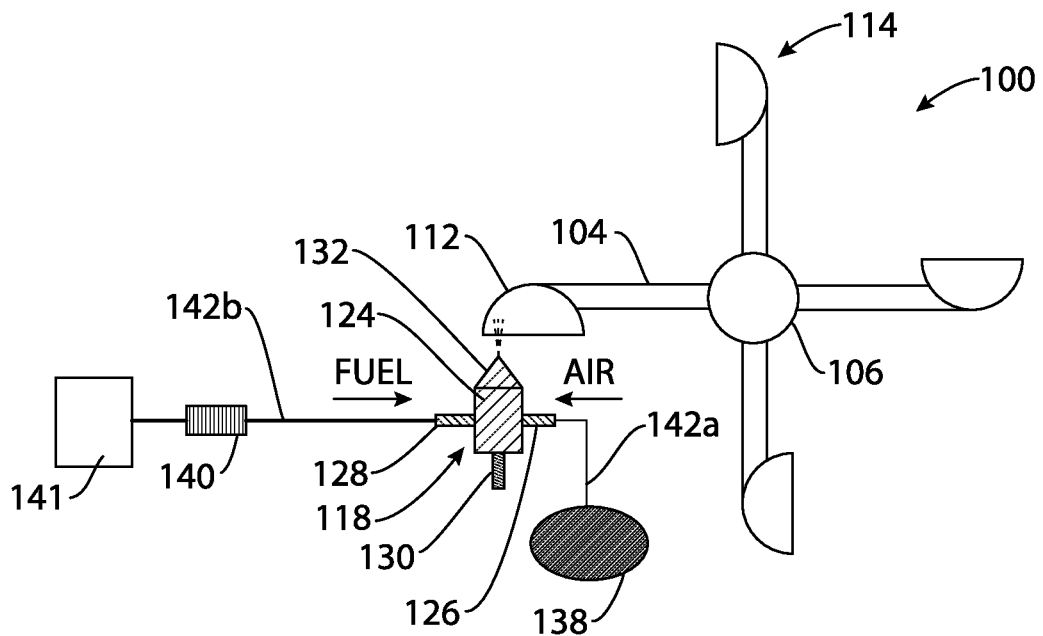
FIGS. 4B and 4C are example block diagrams of the turbine engine system, in accordance with some embodiments.

FIG. 4B is an example block diagram of the turbine engine system 100, in accordance with some embodiments. The turbine engine system 100 also includes an air compressor 138 and a fuel pump 140 coupled to a fuel tank 141. The air compressor 138 and the fuel pump 140 are coupled to each of the plurality of dispensers 118 respectively by, for example, hoses 142 such as high-pressure hoses. The air compressor 138 is configured to deliver air to the air injector 126 of the dispenser 118 and into the combustion chamber 124 via hose 142a. The fuel pump 140 is configured to deliver fuel to the fuel injector 128 of the dispenser 118 and into the combustion chamber 124 via hose 142b. The air compressor 138 and fuel pump 140 are mounted outside of the housing 120.

Figure 4C:
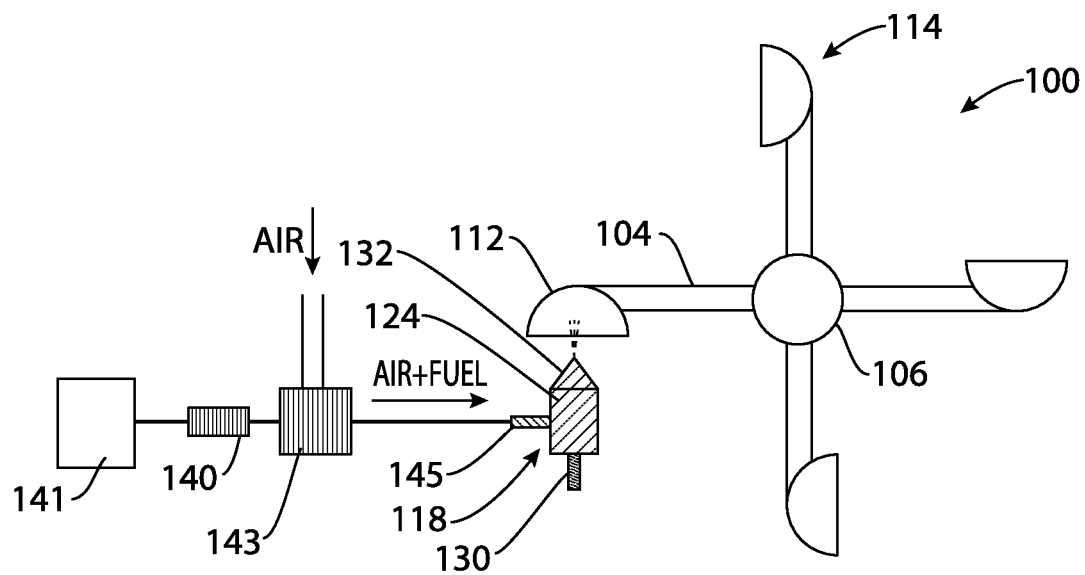

FIG. 4C is an example block diagram of the turbine engine system 100, in accordance with some embodiments. In some embodiments, there is a carburetor 143 instead of the air injector 126 and air compressor 138. In this way, fuel from the fuel pump 140 and ambient air enter into the carburetor 143 and are mixed together with the ratio of fuel to air of 14.7:1. This air-fuel mixture then enters the dispenser 118 via a valve 145 so that the valve 145 regulates the flow of the air-fuel from the carburetor 143 to the combustion chamber 124 of the dispenser 118. The ignitor 130 provides the spark to explode the air-fuel mixture in the combustion chamber 124 and the nozzle 132 directs the gas (from the exploded air-fuel mixture) toward the open surface of each of the plurality of blades 112. The speed and pressure of the gas causes each of the plurality of blades 112 to rotate about the shaft 106 to drive the turbine 114 of the turbine engine system 100.

Figure 5:
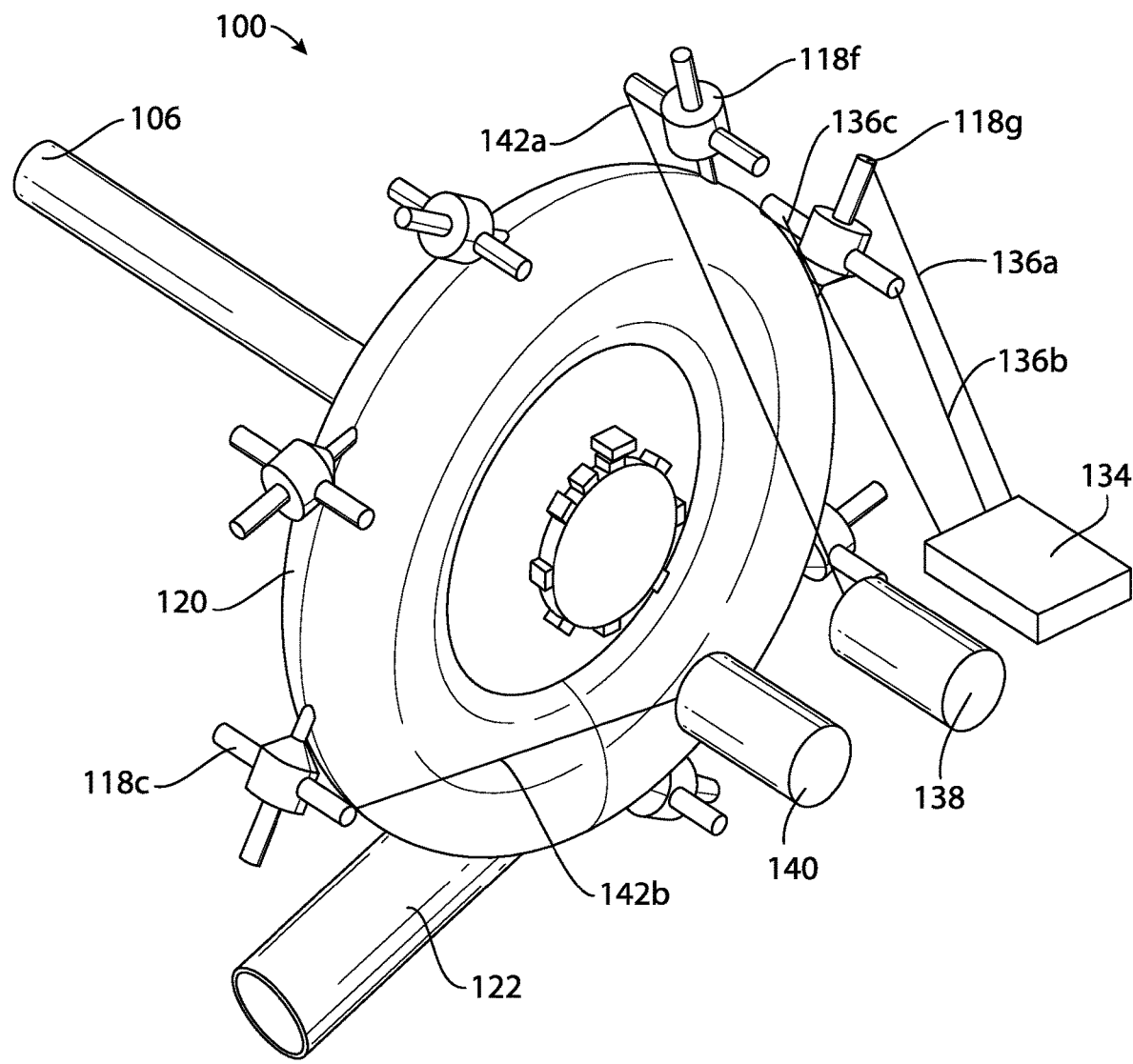
FIG. 5 is a perspective view of the turbine engine system, in accordance with some embodiments.

FIG. 5 is a perspective view of the turbine engine system 100, in accordance with some embodiments. A controller 134 is in communication with the plurality of dispensers 118 and configured to control at least the air injector 126, the fuel injector 128 and the ignitor 130 of each of the plurality of dispensers 118. In some embodiments, the controller 134 is in communication with the valve 145 and configured to control the valve 145. The controller 134 may be coupled to the air injector 126 and the fuel injector 128 to control the opening and closing of an internal air valve in each air injector 126 and an internal fuel valve in each fuel injector 128. The controller 134 may also be coupled to the ignitor 130 with wires to control the ignition in each of the plurality of dispensers 118. For simplicity, in FIG. 5, the wires are shown as 136*a*, 136*b* and 136*c* from the controller 134 to only one of the dispensers 118 such as 118*g*. For example, wire 136*a* is between the controller 134 and ignitor 130, wire 136*b* is between the controller 134 and fuel injector 128 and wire 136*c* is between the controller 134 to air injector 126. The hoses, 142*a* and 142*b*, are shown to only one of the dispensers 118 such as 118*f* and 118*b*. The fuel injector 128 of the dispenser 118 injects the fuel into the combustion chamber 124 via hose 142*b* and communicates via wire 136*b*. The air injector 126 of the dispenser 118 injects the air into the combustion chamber 124 via hose 142*a* and communicates via wire 136*c*.

Figure 6:
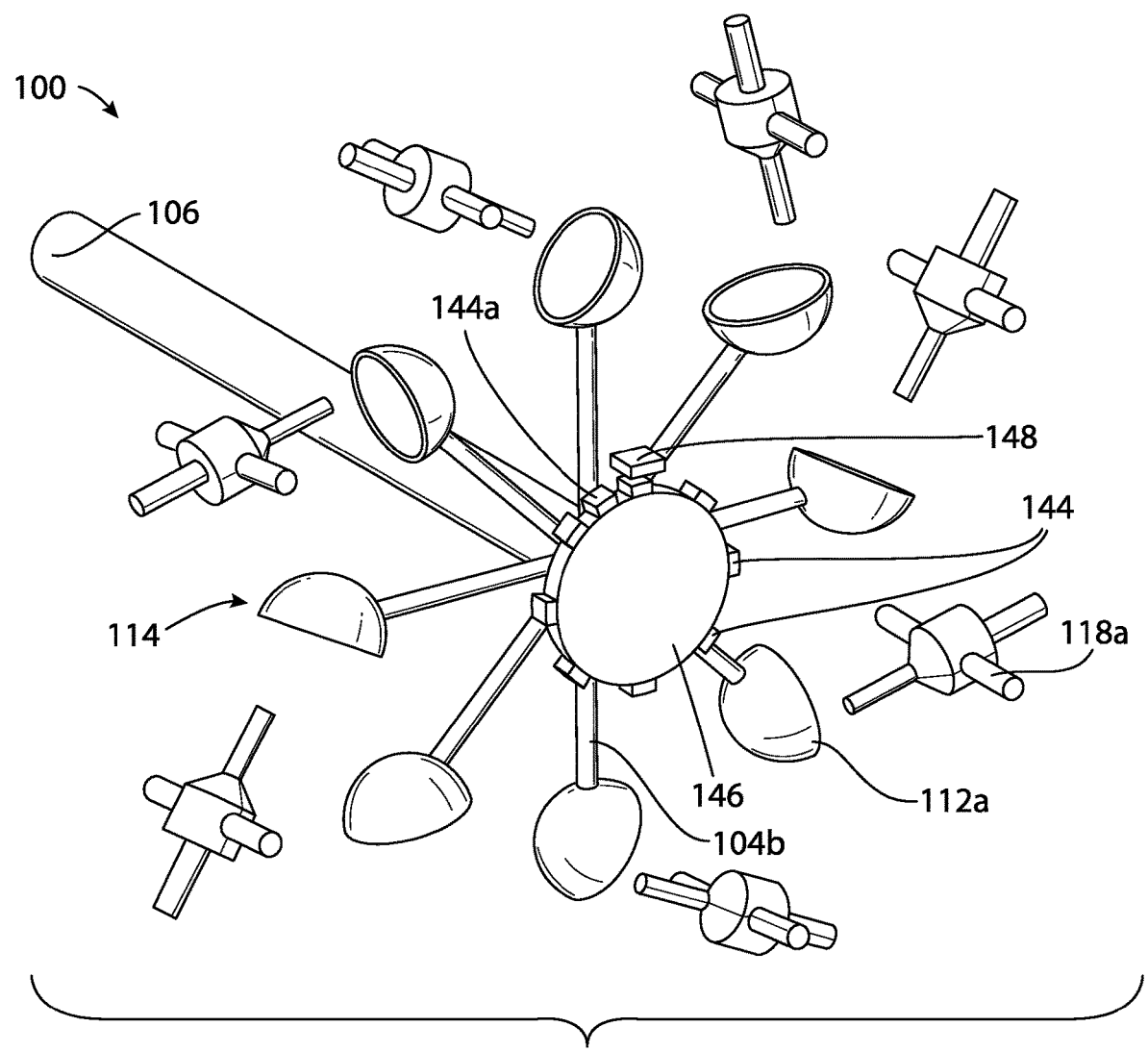
FIG. 6 is a perspective view of the turbine engine system with the housing removed, in accordance with some embodiments.

FIG. 6 is a perspective view of the turbine engine system 100 with the housing 120 removed, in accordance with some embodiments. In some embodiments, the turbine engine system 100 further includes a plurality of magnets 144 for monitoring the position and rotation of the plurality of spokes 104, the plurality of blades 112, and the speed of the turbine engine system 100. Each of the plurality of magnets 144 may be associated with each of the plurality of spokes 104, or each of the plurality of blades 112. Each of the plurality of magnets 144 may be positioned on each of the plurality of spokes 104, or each of the plurality of blades 112, or on a disk 146 configured to rotate or a combination thereof.

In some embodiments, a sensor 148 such as a Hall effect sensor is in a fixed position relative to the rotating plurality of spokes 104, plurality of blades 112, and disk 146 so that the plurality of magnets 144 move past the sensor 148. The sensor 148 is in communication with the controller 134. When the magnets rotate past, for example, the Hall effect sensor 148, an electromagnetic signal is generated. These synchronous bits are used to indicate the position of each of the plurality of blades 112. A reference magnet 144*a* not associated with a particular spoke 104 or blade 112 may be used to determine an original, first position of the plurality of blades 112 of the turbine 114. The controller 134 receives a signal from the sensor indicating the original, first position of each of the plurality of blades 112 and subsequent positions of each of the plurality of blades 112 when the turbine 114 is moving. The controller 134 uses the original, first position of the plurality of blades 112 and determines the amount and timing of the air and the fuel to dispense, and the timing of the spark for ignition. In some embodiments, other methods for measuring rotational speed could be used including shaft encoders, photoelectric sensors or optical detection.

During operation of the turbine engine system 100, the controller 134 receives at least a position of one blade 112 and determines data for operating each of the plurality of dispensers 118. The position of each of the plurality of blades 112 may be relative to each of the plurality of dispensers 118 such as an angular orientation of each of the plurality of blades 112 relative to each of the plurality of dispensers 118. Or, the position of the blades 112 may be relative to each of the plurality of spokes 104 such as an angular orientation of each of the plurality of blades 112 relative to each of the plurality of spokes 104.

The data includes a time (e.g., moment and duration) for each of the plurality of dispensers 118 to dispense the air, and a time (e.g., moment and duration) for each of the plurality of dispensers 118 to dispense the fuel into the combustion chamber 124 based on the position of at least one blade of the plurality of blades 112. The data also includes an amount of the air and an amount of the fuel for each of the plurality of dispensers 118 to dispense into the combustion chamber 124 based on the position of at least one blade of the plurality of blades 112. The data further includes a time for the ignitor 130 to spark the igniting of the air-fuel mixture to cause combustion in the combustion chamber 124 based on the position of at least one blade of the plurality of blades 112. Based on the data, the controller 134 controls the air injector 126, the fuel injector 128 and the ignitor 130. The speed of the turbine engine system 100 may also be controlled. For example, the controller 134 may determine a speed of the turbine engine system 100 from the readings by the Hall effect sensor 148, and can increase or decrease the amount of air-fuel or adjust the timing (e.g., moment and duration) to increase or decrease the speed. A typical piston engine may run at 6,000 rpm or 100 revolutions per second while each ignition of the piston-cylinder (explosion) takes about 2 milliseconds. The turbine engine system 100 uses less gasoline to produce the same power.

In some embodiments, for example, such as when a carburetor 143 is used, the data includes a time to dispense the air-fuel mixture into the combustion chamber 124 of each of the plurality of dispensers 118 via the valve 145 based on the position of at least one blade of the plurality of blades 112. The data also includes an amount of the air-fuel mixture to dispense into the combustion chamber 124 based on the position of at least one blade of the plurality of blades 112, and a time to spark the igniting of the air-fuel mixture to cause combustion in the combustion chamber 124 based on the position of at least one blade of the plurality of blades 112. Based on the data, the controller 134 controls the valve 145 and the ignitor 130.

As shown in FIGS. 1-3 and 5-6, the plurality of dispensers 118 may be employed in the turbine engine system 100. Each of the plurality of dispensers 118 may be spaced circumferentially around the housing 120. The spacing may be even between each of the plurality of dispensers 118 or other spacing patterns may be used depending on the application. In some embodiments, there may be 3, 5, 7, 11, 15 or more plurality of dispensers 118 which correspond to 4, 6, 8, 12 and 16 blades designs of the turbine engine system 100. Generally, there will be one less dispenser 118 than a blade 112 because one mounting position for a dispenser 118 is instead dedicated to the exhaust pipe 122, although other positionings of the exhaust pipe 122 are possible. In some embodiments, there may be half or one-third the amount of the plurality of dispensers 118 compared to the plurality of blades 112 depending on the application. The controller 134 is in communication with the plurality of dispensers 118 and controls each of the plurality of dispensers 118 while in some embodiments, the air compressor 138 and/or the fuel pump 140 (as in FIG. 5) distribute the high-pressure air and fuel to each of the plurality of dispensers 118.

Figure 7A:
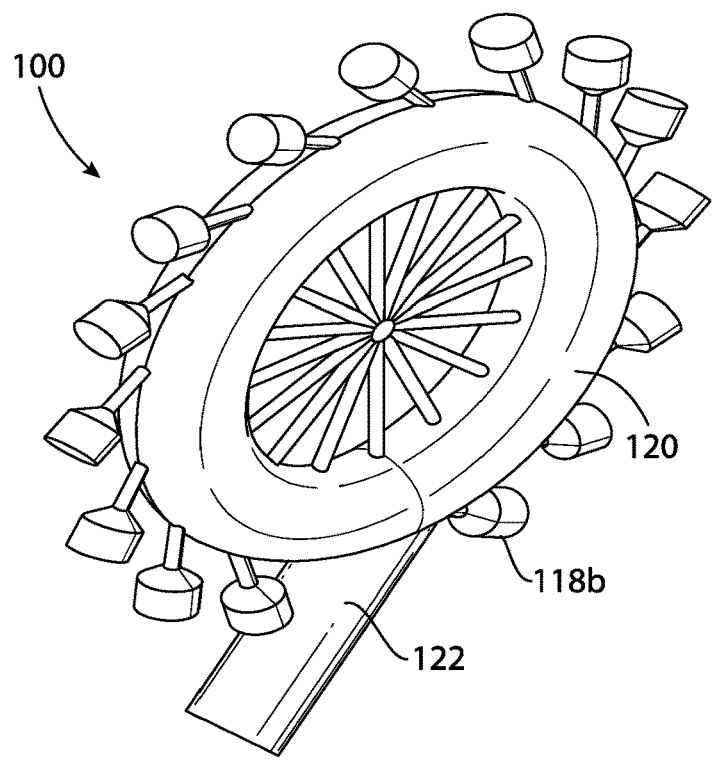
FIG. 7A is a perspective view of the turbine engine system with a 16-blade turbine, in accordance with some embodiments.
Figure 7B:
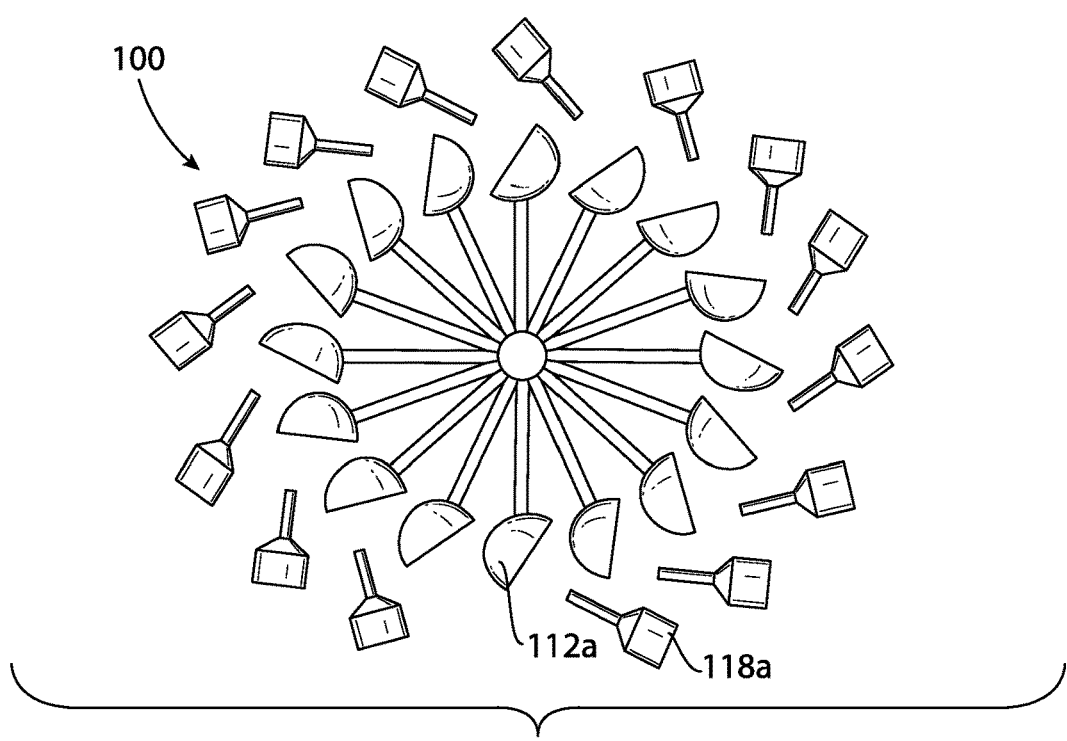
FIG. 7B is a front view of the turbine engine system with a 16-blade turbine with the housing removed, in accordance with some embodiments.
Figure 8A:
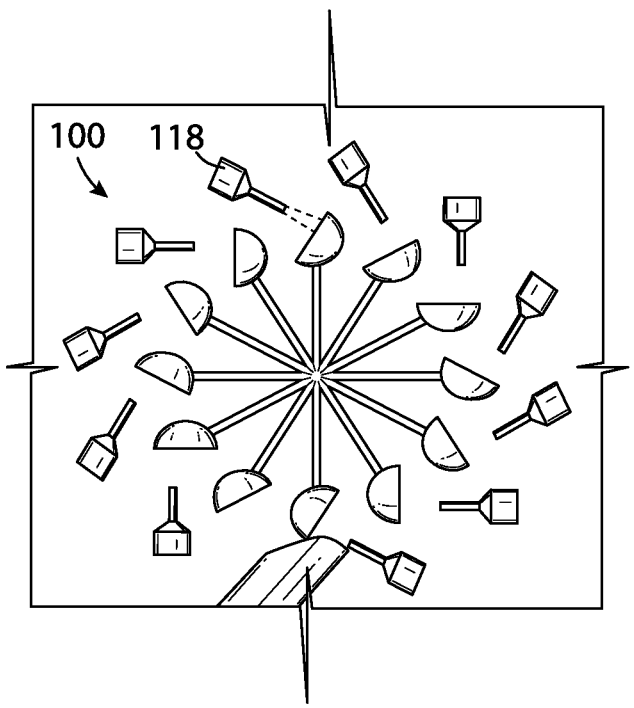
FIG. 8A-8F show examples of the operation of a 12-blade turbine engine system, in accordance with some embodiments.
Figure 8B:
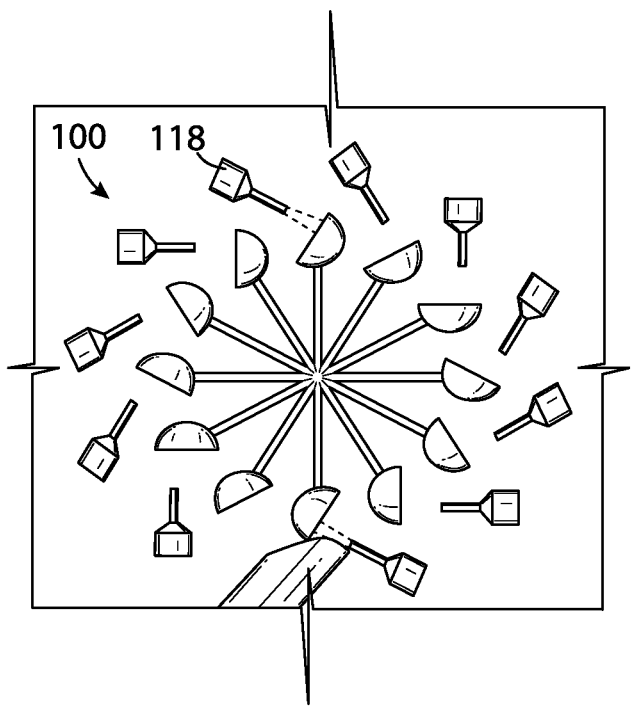
Figure 8C:
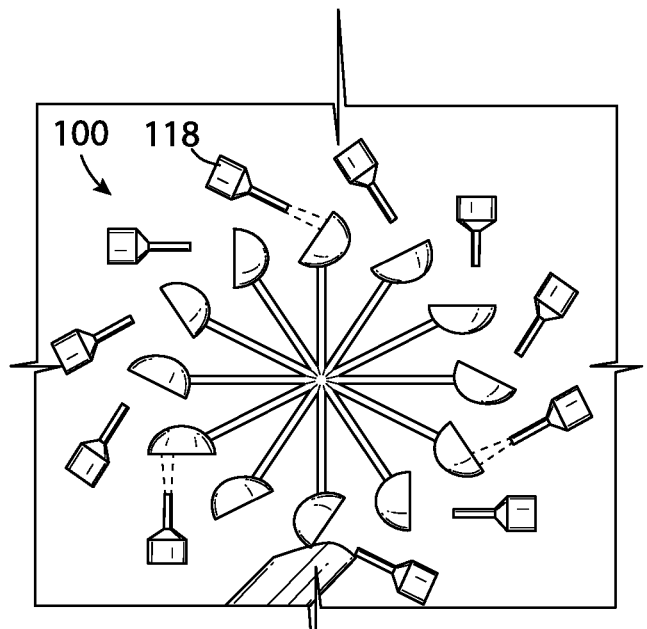
Figure 8D:
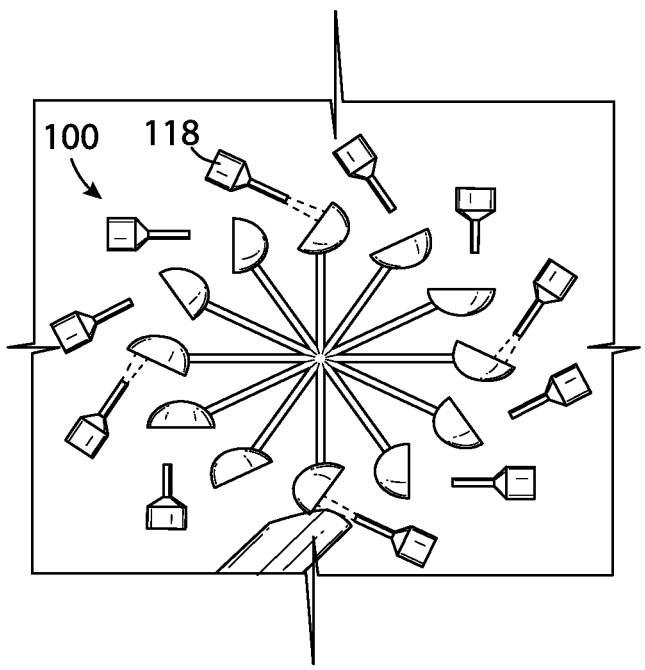
Figure 8E:
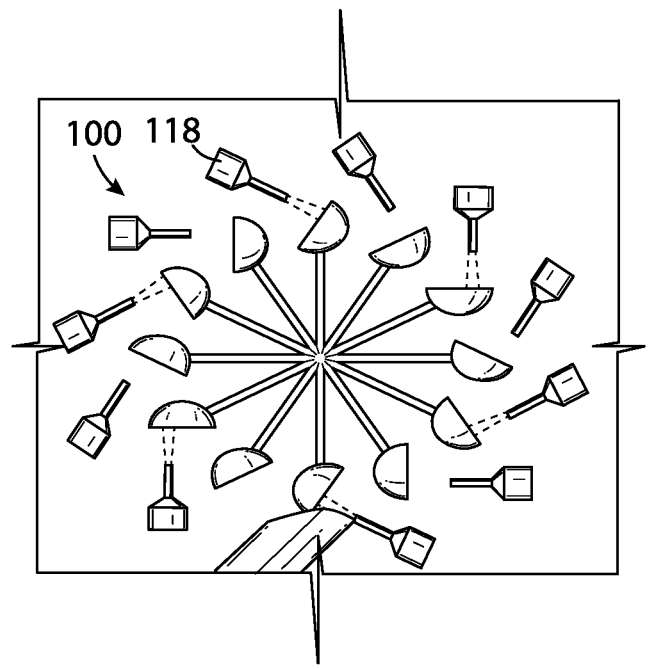
Figure 8F:
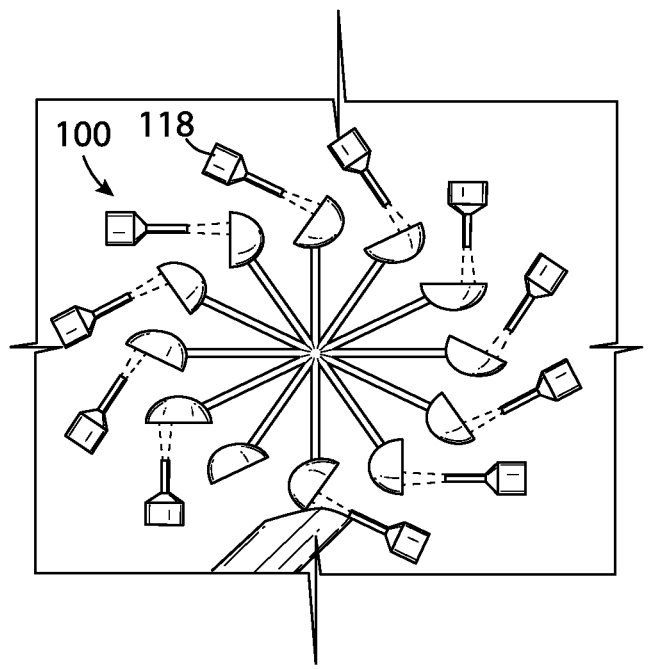
Figure 9:
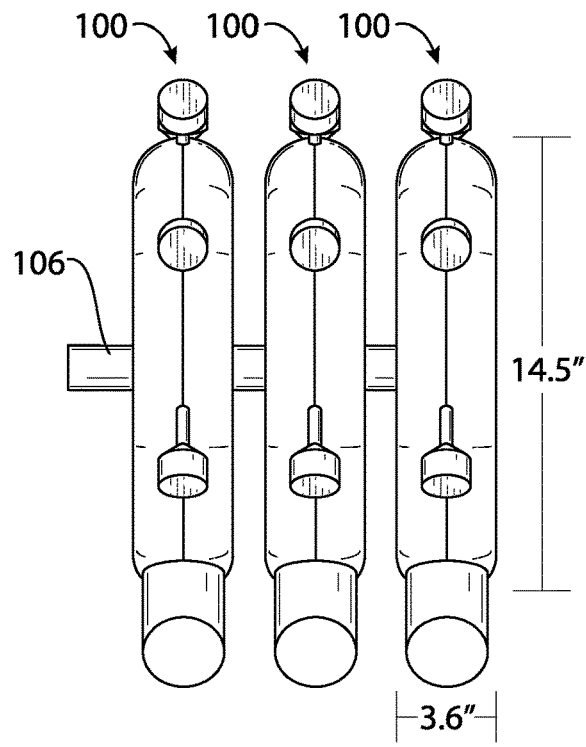
FIG. 9 is a side view of the plurality of turbine engine systems, in accordance with some embodiments.

FIG. 7A is a perspective view of the turbine engine system 100 with a 16-blade turbine design, in accordance with some embodiments, and FIG. 7B is a front view of the turbine engine system 100 with a 16-blade turbine with the housing 120 removed, in accordance with some embodiments. In order to increase rotation speed (rpm), torque, and power, additional, longer spokes with larger blades may be used. For example, an 8-blade turbine may be employed for some designs such as a small passenger vehicle. By increasing the number of spokes 104 of the plurality of spokes 104 from eight to 16, using longer spokes 104 than the 8-blade turbine, and increasing the size of the blade 112 (e.g., the diameter of the hemispherical-shaped cup with an open surface) more power can be achieved. This may be used to generate power for a larger vehicle such as a 1,000 to 3,000 ton aquatic vessel. In some embodiments, the 8-blade turbine may have a housing 120 with a 14.5-inch diameter and a thickness of 3.6 inches. The length from the shaft 106 to the end of one of the plurality of blades 112 along the length of the spoke 104 may be six inches. FIG. 9 shows these sample dimensions for the 8-blade turbine. The size of the housing is dependent on the diameter of the plurality of blades 112 and the thickness of the housing is dependent on the size of each of the plurality of blades 112. When the number of blades is increased from eight to 16 and the size of the blades 112 are increased, the 16-blade turbine, for example, may have a 30-inch diameter and be 8 inches in thickness which results in about 10 times more power than the 8-blade turbine.

Any number of dispensers 118 may be activated at any time or in any sequence to move the turbine 114. FIG. 8A-8F show examples of the operation of a 12-blade turbine engine system, in accordance with some embodiments. The number of dispensers 118 activated at the same time may be used to classify the type of ignition. For example, a 1-ignition means that one dispenser 118 is activated at any given moment whereas a 3-ignition means that three dispensers 118 are activated at the same time. Other examples may be 4-ignition, 6-ignition, and full ignition. In full ignition, all dispensers 118 of the plurality of dispensers 118 are activated at the same time. For example, a single ignition, 2-ignition, 3-ignition, 4-ignition, 6-ignition, and full ignition are shown in FIGS. 8A-8F, respectively. The controller 134 determines which dispensers 118 to activate such as three dispensers 118, seven dispensers 118 or 11 dispensers 118 and how often. The plurality of dispensers 118 may be activated at the same time or in a particular sequence. In this way, a desired torque and desired rotational speed can be achieved by the turbine 114 of the turbine engine system 100. In some embodiments, by having more firing dispensers 118, more power, more torque and stability can be achieved at a timing interval compared to having only one dispenser 118. This also reduces the risk of overheating.

FIG. 9 is a side view of a plurality of turbine engine systems, in accordance with some embodiments. In this example, a plurality of turbine engine systems such as three turbine engine systems 100 are coaxially coupled to the shaft 106 as another way to increase power for a particular application. There may be one controller 134 or a plurality of controllers working together to coordinate the control of each of the plurality of dispensers 118.

Figure 10:
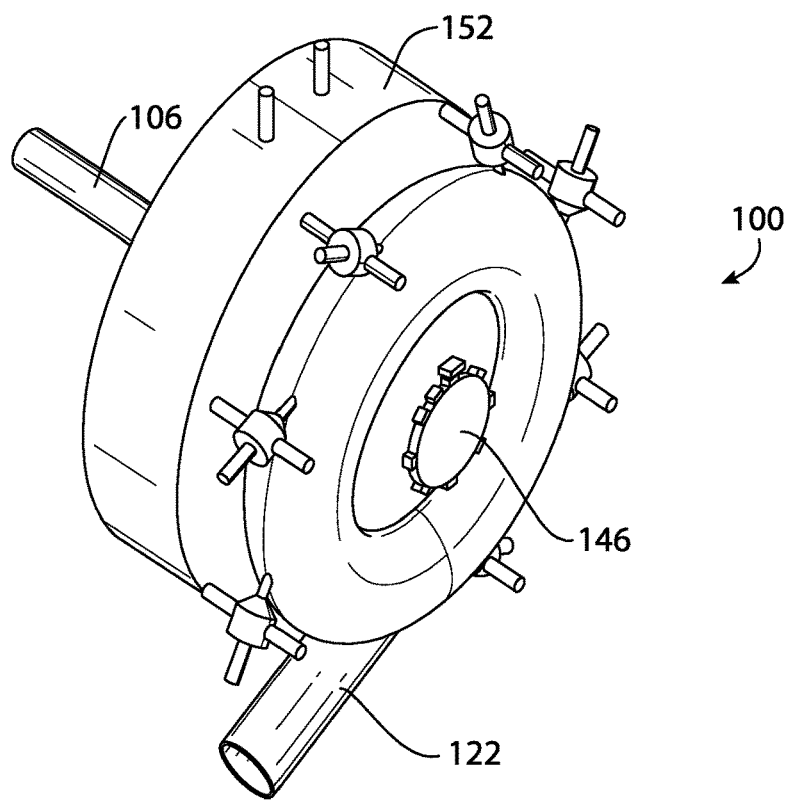
FIG. 10 is a perspective view of the turbine engine system coupled to an axial flux motor, in accordance with some embodiments.

The shaft 106 of the turbine engine system 100 may be coupled to other components such as a motor, generator, wheel, propeller or transmission system, and drive these components. FIG. 10 is a perspective view of the turbine engine system 100 coupled to an axial flux motor 152, in accordance with some embodiments. In a specific example, the axial flux motor 152 may have a 368 mm diameter, a 98 mm thickness and weigh 37 kg. For example, this configuration where the axial flux motor 152 is aided by the turbine engine may generate 240 kW (750 V×320 A) of electricity at 2500 rpm and have about 95% efficiency. Comparably, a large 3.0 L piston engine could be used to generate 240 kW but the efficiency is only 35%. The turbine engine system 100 in this configuration has a smaller footprint and lighter weight than the conventional piston-based engine. In another embodiment, the turbine engine system 100 may be coupled to a plurality of axial flux motors depending on the application.

Figure 11:
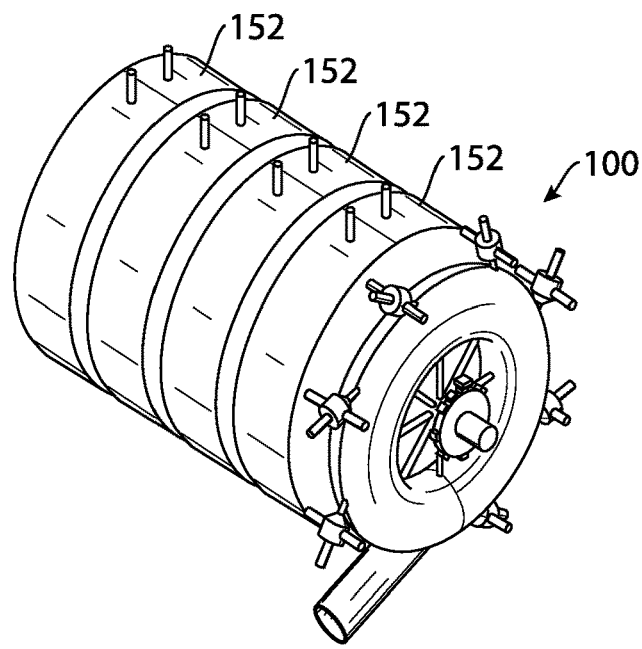
FIG. 11 shows a turbine engine system coupled to a plurality of axial flux motors, in accordance with some embodiments.
Figure 12:
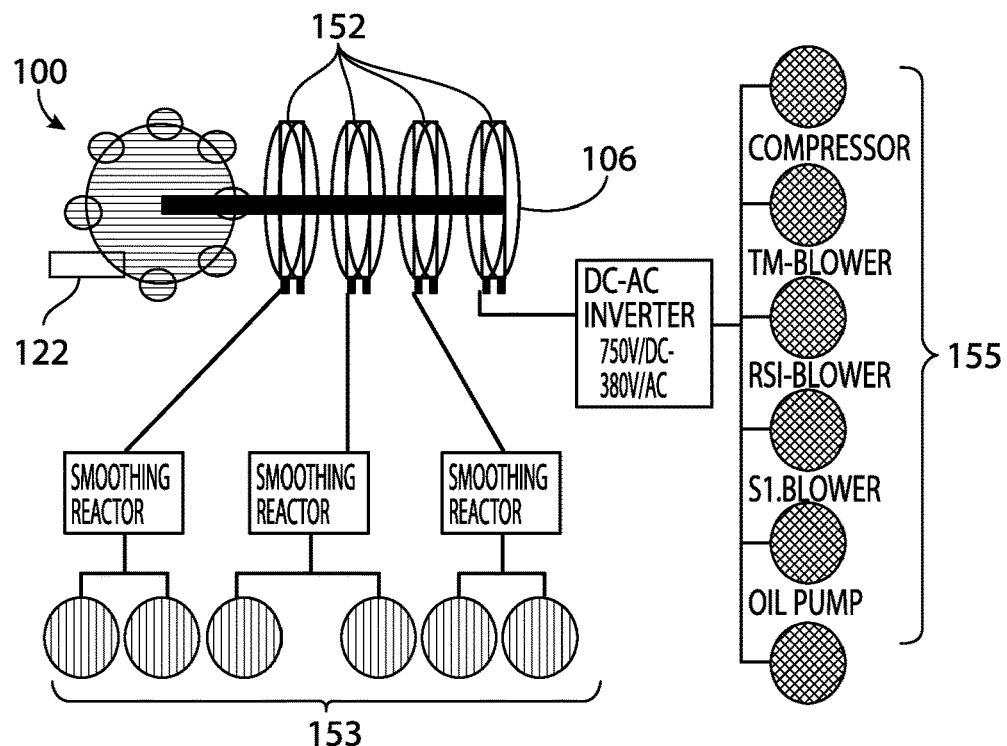
FIG. 12 is an example block diagram for the turbine engine system in the locomotive, in accordance with some embodiments.

FIG. 11 shows a turbine engine system 100 coupled to a plurality of axial flux motors, in accordance with some embodiments. This may be used for replacing the engine in, for example, a locomotive of a passenger train, freight train, or high-speed train. Replacing the conventional locomotive with the turbine engine system 100 saves weight and significantly reduces the amount of powertrain components. For example, the complicated pantograph on top of the locomotive and the main transformer are no longer needed. Also, for a typical electric train, a high-voltage wire is embedded in or above the train track to operate the train. This can be eliminated when implementing the turbine engine system 100. The thermal efficiency of the turbine engine system 100 is significantly higher than the conventional gas-turbine locomotive engine such as 70-95% versus 45%. FIG. 12 is an example block diagram for the implementation for the turbine engine system 100 in the locomotive. For example, the turbine engine system 100 coupled to the plurality of axial flux motors 152 is used to drive traction motors 153 and other components 155 of the train.

Figures 13, 14:
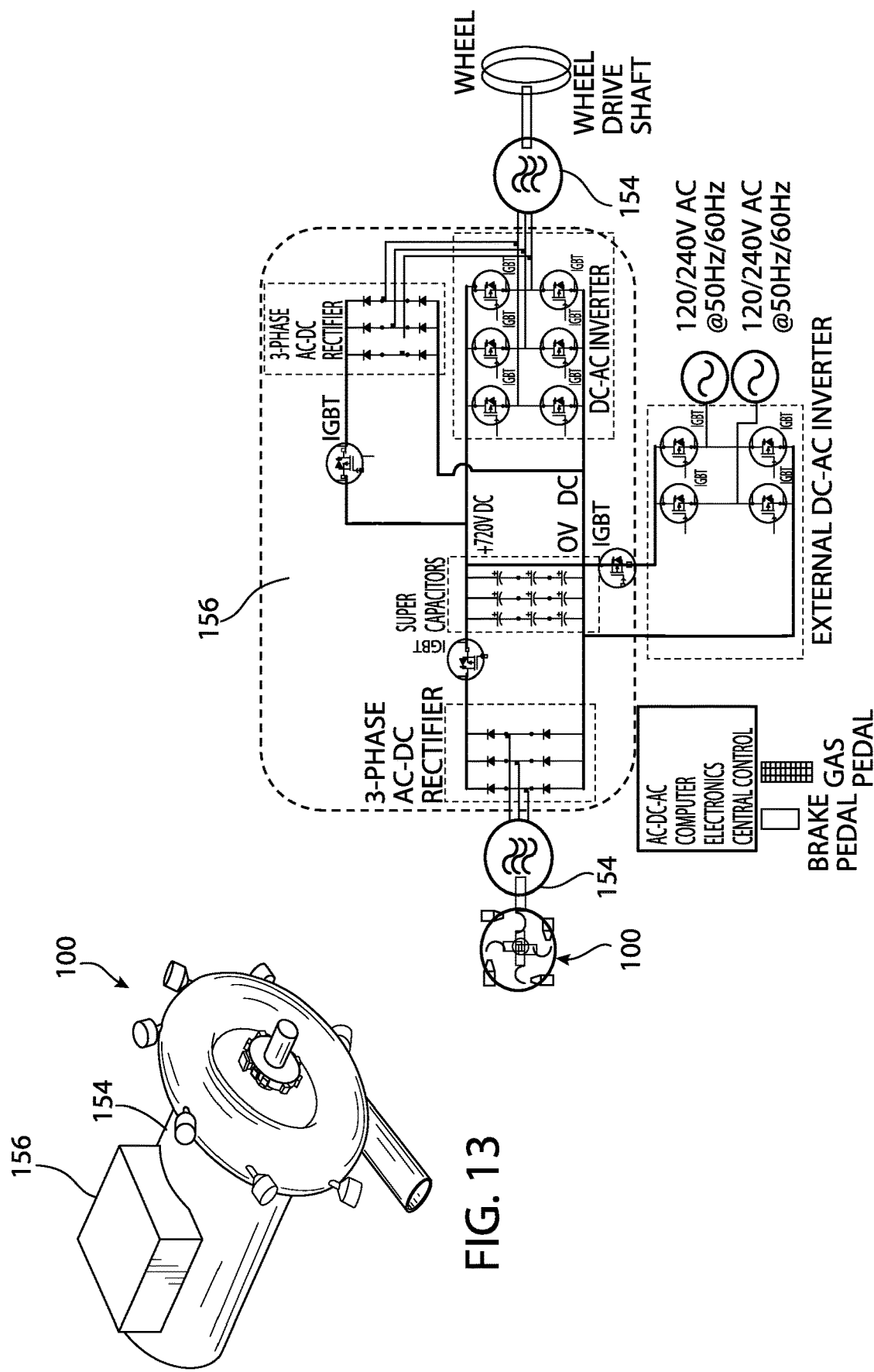
FIG. 13 is a turbine engine system used in an electric vehicle system, in accordance with some embodiments.
FIG. 14 is an example block diagram for the implementation for the turbine engine system in an electric vehicle, in accordance with some embodiments.

FIG. 13 is a turbine engine system 100 used in an electric vehicle system, in accordance with some embodiments. The turbine engine system 100 may be coupled to a generator of a permanent magnet motor (PMM) 154 combined with an electrical box 156 which contains a 3-phase AC-DC rectifier to operate similar to a large Lithium battery such as in an electric vehicle. For example, this configuration is a high-efficient, quiet, lightweight, small power source. In this way, supercapacitors collect the kinetic energy when the brake pedal is applied or when the accelerator pedal is released. This eliminates the need to recharge the lithium-ion battery and charging stations in general. The turbine engine system 100 with the permanent magnet motor generator can be implemented on an existing electric vehicle so retooling of existing components for the vehicle is not needed. FIG. 14 is an example block diagram for the implementation for the turbine engine system 100 in an electric vehicle. In this scenario, the electrical box 156 includes supercapacitors.

In some embodiments, two or more turbine engine system 100 with the permanent magnet motor generators can be coupled together for more power generations and be used in a large truck such as a semi-trailer truck or a locomotive. In other embodiments, the turbine engine system 100 with the permanent magnet motor generator may be implemented to supply electricity to a house, business or factory.

Figure 15:
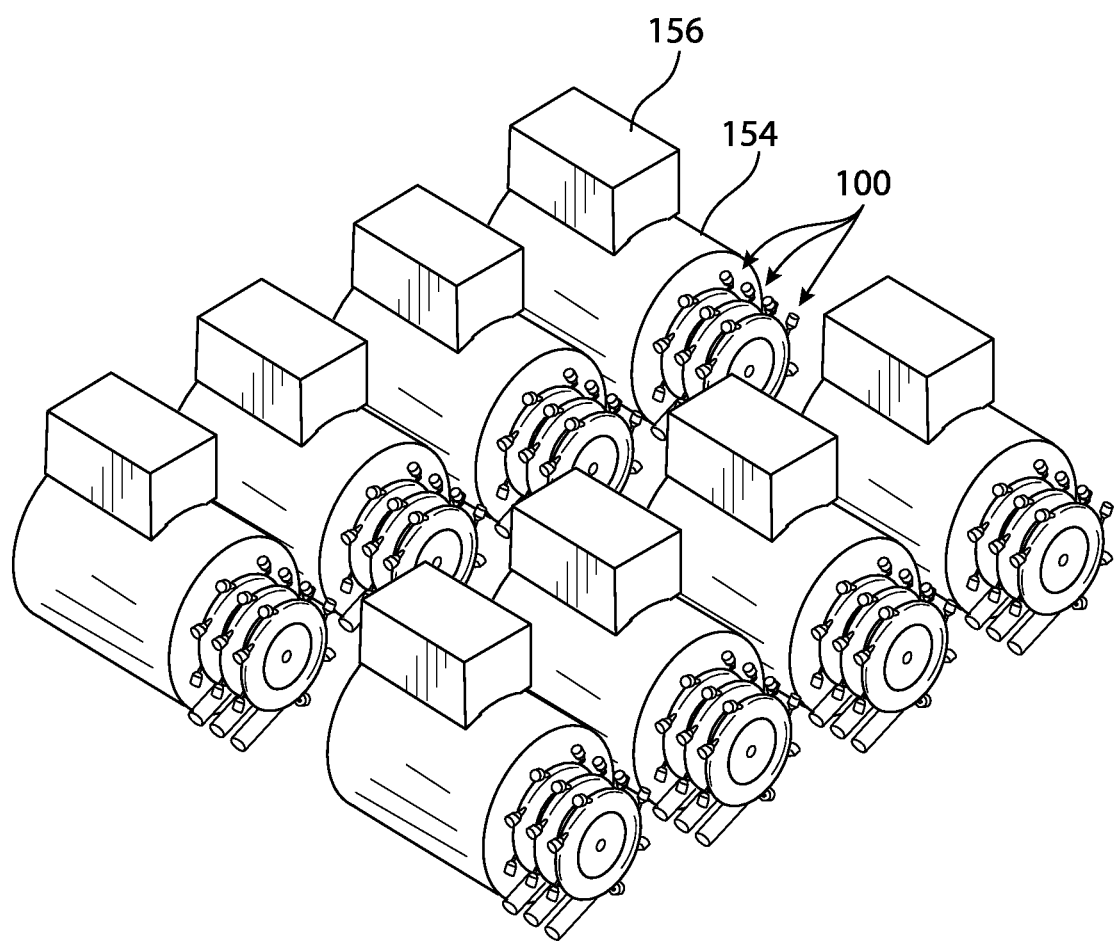
FIG. 15 is a plurality of turbine engine systems coupled to a generator, in accordance with some embodiments.

In some embodiments, the configuration of FIG. 11, or the turbine engine system 100 coupled to a plurality of axial flux motors, may be used for a large power plant/farm generator. Each turbine engine system 100 coupled to a plurality of axial flux motors may produce at least 500 kW, such as at least 750 kW, or such as at least 960 kW for a 16-blade turbine. Comparably, a large wind turbine may produce an average of 2.5 to 3.0 MW. Therefore, the turbine engine system 100 coupled to the plurality of axial flux motors may replace one traditional wind turbine. The power plant/farm may use artificial intelligence for control of the system so energy is not wasted. Traditional off-shore wind turbines used in power plant/farms are very large such as approximately 850 feet, whereas the turbine engine system 100 implemented in the power plant/farm is much smaller. In some embodiments, a plurality of turbine engine systems (as shown in FIG. 9) may be coupled to the generator/PMM 154 and electrical box 156 thereby producing 500 kW to 5 MW synchronously. FIG. 15 is a plurality of turbine engine systems coupled to a generator/PMM 154, in accordance with some embodiments. This configuration may form a mega power plant/farm producing power of 50 MW to 5 GW, and provide dynamic electricity supply for peak-hour and off-peak hours.

The power plant/farm implementations for the plurality of turbine engine systems 100 provides redundancy and resilience while traditional, costly components such as transmission lines, poles, towers, transformers, switches/relays, and power distribution hubs are eliminated. A smaller footprint of land is needed than for a traditional power plant/farm. Also, an internal cooling system is not needed and fuel is not consumed to heat up water for steam. The turbine engine systems implemented as power plant/farm may be located near where the power is needed so that transformers or high-voltage power lines are not required thereby also reducing losses during transmission.

Figure 17:
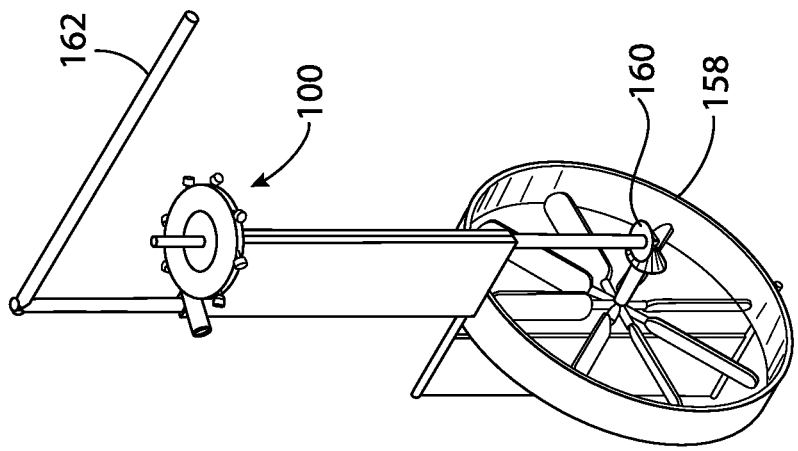
FIG. 17 is a perspective view of a turbine engine system coupled to a propeller for a personal watercraft, in accordance with some embodiments.
Figure 16:
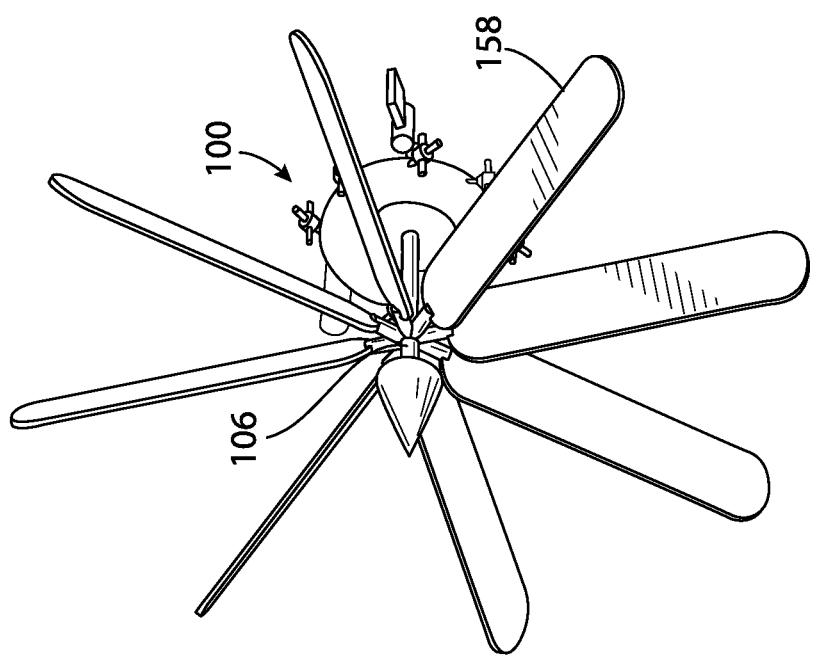
FIG. 16 shows the turbine engine system coupled to a propeller, in accordance with some embodiments.

FIG. 16 shows the turbine engine system 100 coupled to a propeller 158, in accordance with some embodiments. The shaft 106 of the turbine engine system 100 may directly couple to the propeller 158 without a gear change. When the propeller 158 is part of an aircraft, the turbine engine system 100 can be programmed to a desired rotational speed for take-off. In another embodiment, the propeller 158 may be part of a ship. The turbine engine system 100 can be customized by sizing the system per the application. For example, the 8-blade turbine may be implemented in some designs, but for more desired power, a 12-blade turbine, 16-blade turbine, 20-blade turbine, or larger can be implemented. In another embodiment, the propeller 158 may be part of a personal watercraft. FIG. 17 is a perspective view of a turbine engine system 100 coupled to a propeller 158 for a personal watercraft, in accordance with some embodiments. In this embodiment, the turbine engine system 100 is coupled to the propeller 158 by a gear box 160 for a 90° angle gear transformation. A tiller 162 is shown for steering.

Figure 18:
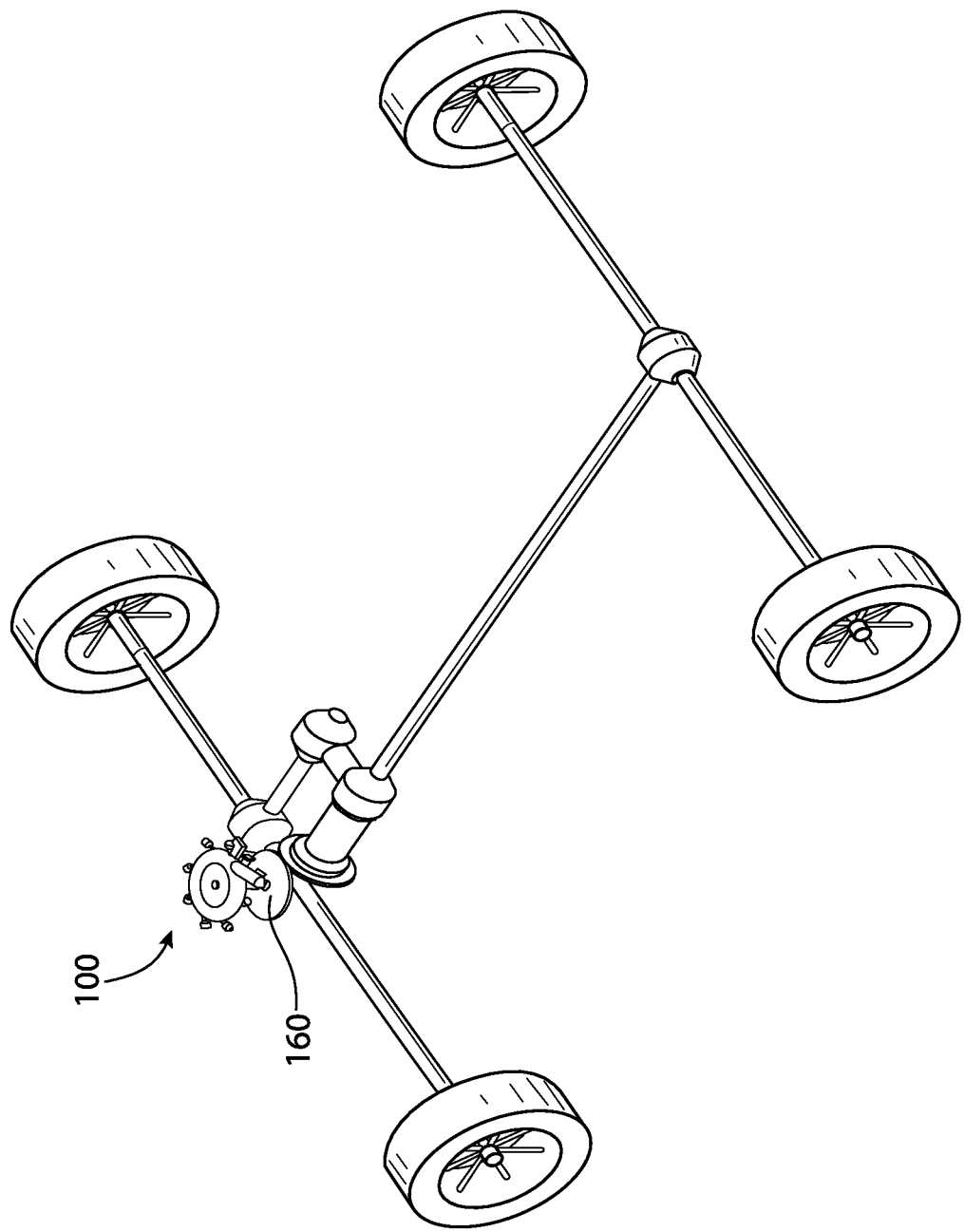
FIG. 18 depicts the turbine engine system mounted in a passenger vehicle, in accordance with some embodiments.

A typical passenger vehicle engine may have dimensions of 33 inches×22 inches×30 inches, weigh 164 kg and produce 245 horsepower. This can be replaced with the turbine engine system 100 having a small size and less weight. For example, the turbine engine system 100 including other components such as the air compressor 138 and fuel pump 140 may have dimensions of 16 inches×20 inches×16 inches, weigh 30-55 kg and produce 300 horsepower. FIG. 18 depicts the turbine engine system 100 mounted in a passenger vehicle, in accordance with some embodiments. The size and weight savings of the turbine engine system 100 can benefit component packaging and fuel economy. The turbine engine system 100 may be coupled to the transmission system by the gear box 160 for a 90° angle gear transformation. In another embodiment, the turbine engine system 100 may replace the traditional engine in a semi-trailer truck.

Figure 20:
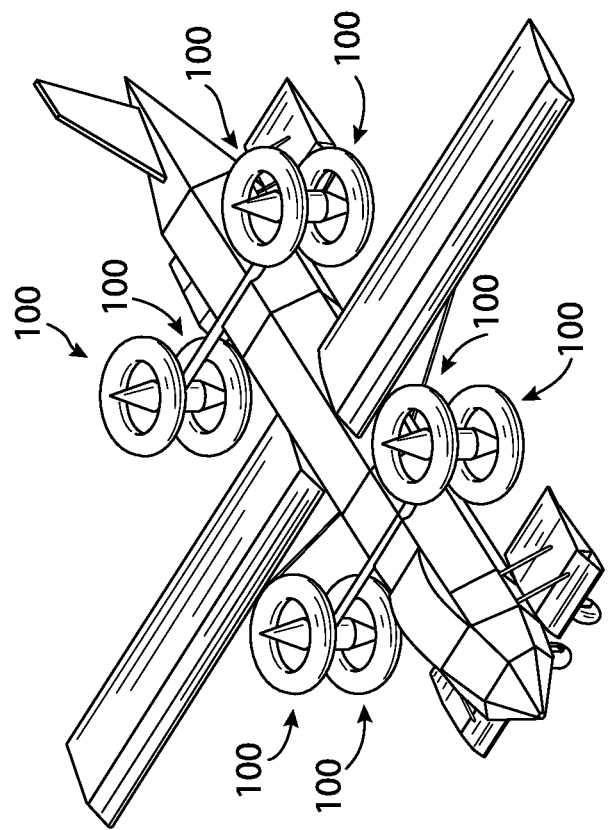
FIG. 20 shows a plurality of turbine engine systems in a vertical take-off and landing aircraft, in accordance with some embodiments.
Figure 19:
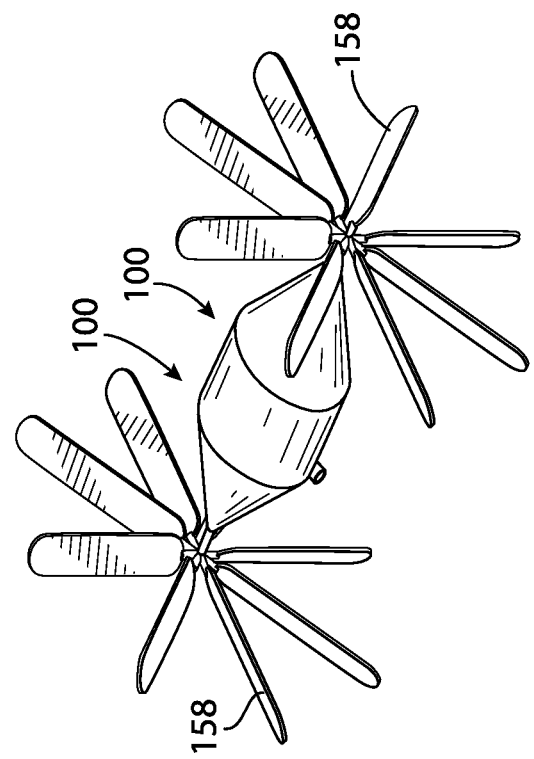
FIG. 19 shows two turbine engine systems with counter-rotating propellers, in accordance with some embodiments.

To generate more thrust for an airplane, two independent turbine engine systems 100 may be implemented. FIG. 19 shows two turbine engine systems 100 with counter-rotating propellers 158, in accordance with some embodiments. For example, two independent turbine engine systems 100 may be coupled together with counter-rotating propellers 158. In this way, more thrust may be generated with no losses due to gear friction. FIG. 20 shows a plurality of turbine engine systems in a vertical take-off and landing aircraft, in accordance with some embodiments. Each turbine engine system 100 can rotate on a first axis of the aircraft in a range between a 0° horizontal position to a 90° vertical position. This enables a high amount of maneuverability of the aircraft in roll, yoke and yaw directions while enabling vertical take-off and landing. This is disclosed in Jeng, U.S. Provisional Patent Application No. 62/976,829, entitled "Aircraft," and is hereby incorporated by reference.

In some embodiments, the turbine engine system 100 may be used for a submarine. For a typical submarine, the submarine stays submerged depending on the life of the battery. Once the battery runs out of charge, the submarine must emerge for air to run the diesel engine and charge the battery. The turbine engine system 100 may be implemented to generate power for the submarine by using an air independent propulsion system. For example, the turbine engine system 100 may use hydrogen peroxide as the oxidizer instead of fresh air which is similar to a liquid-fuel rocket. By using hydrogen peroxide, no external air is needed because the electricity generated on the submarine can be used to generate oxygen and electricity for the submarine crews enabling the submarine to stay underwater for up to a few weeks. The turbine engine system 100 can direct drive the submarine propeller for sailing underwater.

The turbine engine system 100 can be used to generate electricity for the home. For example, the turbine engine system 100 may be coupled to the axial flux motor 152, a battery, an inverter and a panel. The battery may be used as a backup while the inverter converts the 12/24/48 V DC battery to 120 V, 60 hz AC electricity. The inverter can directly connect to the circuit breaker/distribution panel to supply the electricity to the household. Artificial intelligence may be used to control the system. This implementation can save the consumer money on electric bills without service interruption from natural disasters or the need for a gas line and electric line. In some embodiments, the liquified natural gas supplied to the home can be used as the fuel in the turbine engine system 100.

In some embodiments, the turbine engine system 100 can be used as a portable generator. A typical portable generator may have dimensions of 119 inches×40 inches×83 inches, weigh 1500 kg and produce 100 kW. This can be replaced with the turbine engine system 100 coupled to, for example, the axial flux motor 152. For example, the turbine engine system 100 may have dimensions of 20 inches×20 inches× 20 inches, weigh 50-75 kg and produce 240 kW.

Figure 22:
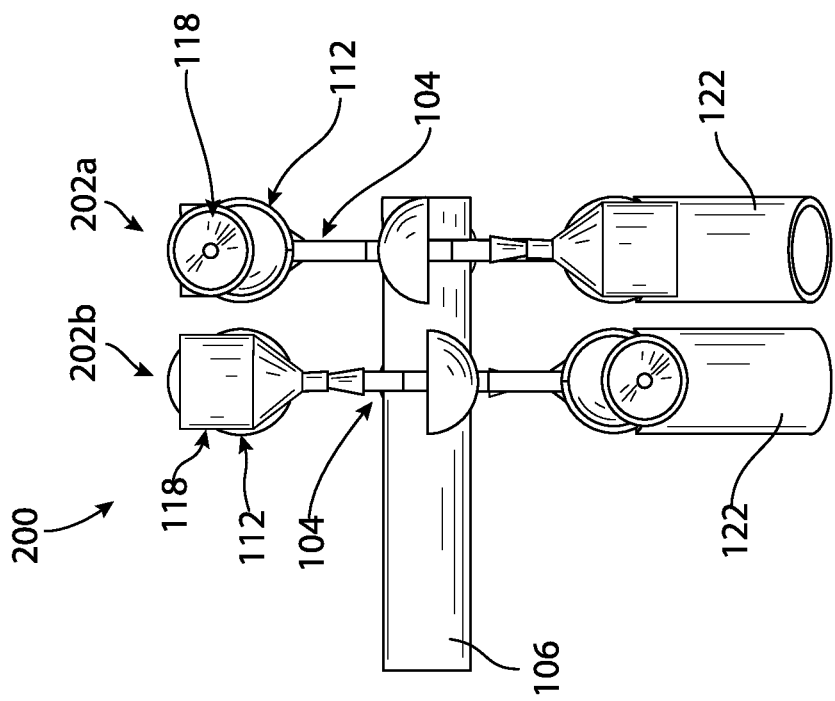
FIG. 22 is a side view of the reversible turbine engine system, in accordance with some embodiments.
Figure 21:
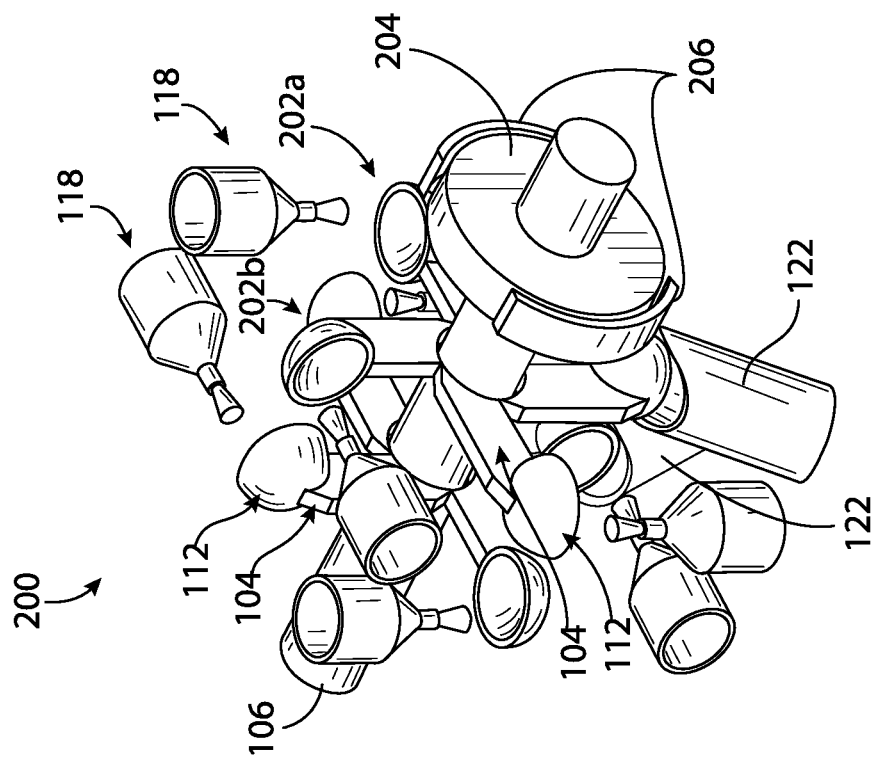
FIG. 21 is a perspective view of a reversible turbine engine system, in accordance with some embodiments.
Figure 23:
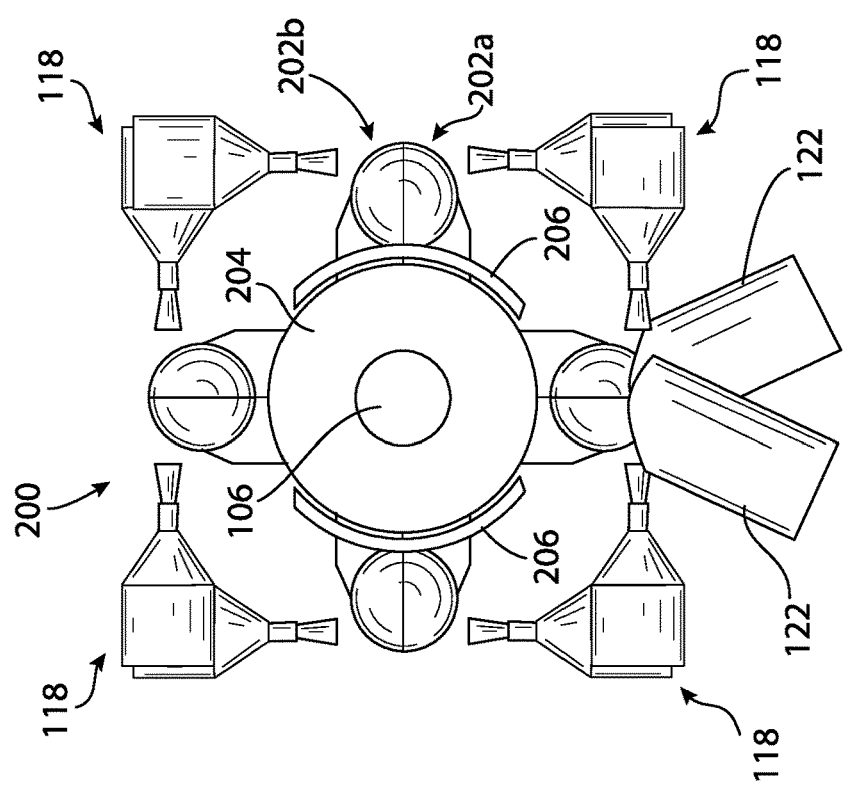
FIG. 23 is a front view of the reversible turbine engine system, in accordance with some embodiments.

The turbine engine system 100 can be designed for enabling a passenger vehicle to travel in the reverse direction such as for backing up and parking maneuvers, and further, with braking capability. FIG. 21 is a perspective view of a reversible turbine engine system 200, in accordance with some embodiments, FIG. 22 is a side view of the reversible turbine engine system 200, in accordance with some embodiments, and FIG. 23 is a front view of the reversible turbine engine system 200, in accordance with some embodiments. In FIGS. 21-23, the housings 120 of the reversible turbine engine system 200 are not shown for simplicity. The housings 120 are similar to the housings 120 as shown in at least FIGS. 1, 5 and 7. Two turbines, 202*a* and 202*b*, are coupled to the shaft 106 in opposing directions meaning turbine 202*a* is positioned on the shaft 106 at 180° to turbine 202*b*. In this way, the open surface of each of the plurality of blades 112 of turbine 202*a* are opposing the open surface of each of the plurality of blades 112 of turbine 202*b* when rotating relative to the shaft 106. The turbines 202*a* and 202*b* each include the plurality of spokes 104, the plurality of blades 112 and the plurality of dispensers 118 with embodiments as described herein. In this configuration, turbine 202*a* may rotate in a first direction such as counter-clockwise while turbine 202*b* may rotate in a second direction such as clockwise. Turbine 202*a* may rotate in a different direction than turbine 202*b*.

Referring to FIGS. 21 and 23, a flywheel 204 is coupled to the shaft 106 and configured to rotate relative to the shaft 106. The flywheel 204 includes a plurality of brake shoes 206 which are configured to contact the flywheel 204 to prevent the flywheel 204 from rotating. In this way, when the flywheel 204 is rotating and the plurality of brake shoes 206 are activated, the plurality of brake shoes 206 contact against the flywheel 204 and slow the vehicle to enable braking capabilities. The flywheel 204 and the plurality of brake shoes 206 may be in communication with the controller 134 so that the controller 134 facilitates the operation.

Figure 24:
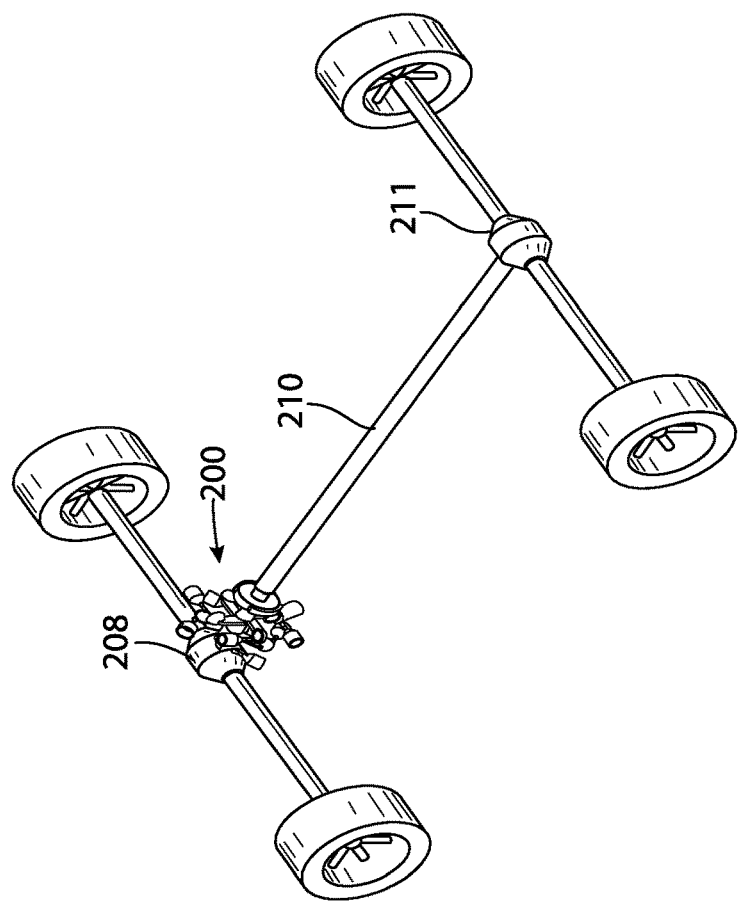
FIG. 24 shows the reversible turbine engine system mounted in passenger vehicle, in accordance with some embodiments.

The reversible turbine engine system 200 may be mounted in a passenger vehicle as shown in FIG. 24. The reversible turbine engine system 200 in a passenger vehicle replaces the conventional engine and transmission (gearbox), and may be sized to meet speed and torque requirements per application. The thermal efficiency of the reversible turbine engine system 200 may be 70-95% in contrast to the conventional piston engine with a thermal efficiency of about 35%. The reversible turbine engine system 200 may be suitable for use in a two-wheel drive vehicle or a four-wheel drive vehicle. For example, in a front two-wheel drive vehicle or four-wheel drive vehicle, the reversible turbine engine system 200 may be located near the front differential 208 and coupled to a prop-shaft 210. In a rear two-wheel drive vehicle, the reversible turbine engine system 200 may be located near the rear differential 211.

Figure 25:
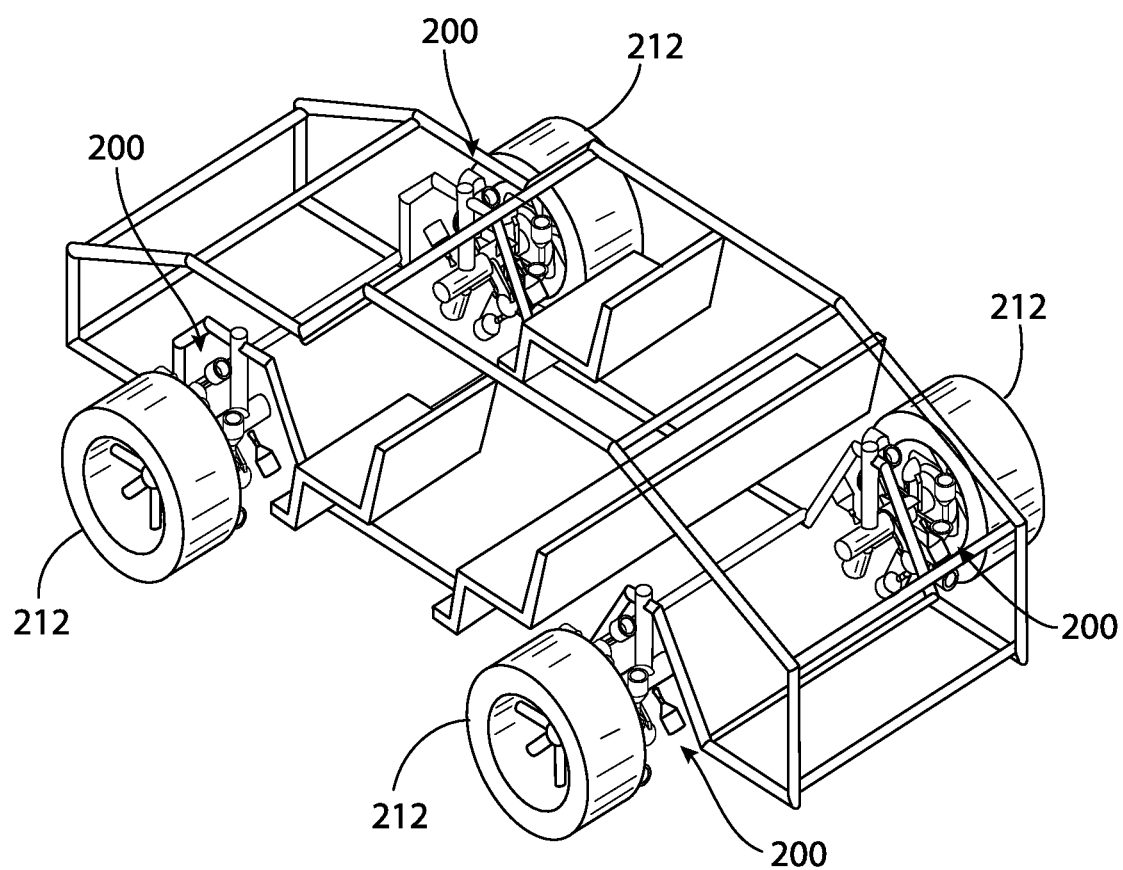
FIG. 25 shows the reversible turbine engine system mounted in a passenger vehicle near a wheel, in accordance with some embodiments.

In another embodiment, the reversible turbine engine system 200 may be implemented in a passenger vehicle and mounted near a wheel 212. FIG. 25 shows the reversible turbine engine system 200 mounted in a passenger vehicle near a wheel 212. For example, there may be a reversible turbine engine system 200 mounted at each wheel 212 for a four-wheel drive vehicle, or there may be a reversible turbine engine system 200 mounted at each front wheel 212 for a front two-wheel drive vehicle, or there may be a reversible turbine engine system 200 mounted at each rear wheel 212 for a rear two-wheel drive vehicle. In these scenarios, the conventional engine and most drivetrain components are eliminated.

Similarly, the turbine engine system 100 and the reversible turbine engine system 200 may be substituted for or replace the motor on other types of motorized devices such as motorcycles, lawnmowers, snow blowers, snow throwers, electric bicycles, scooters, personal watercrafts such as wave runners and jet skis, farm machinery, etc.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A system comprising:
   a) a turbine having a plurality of spokes, the plurality of spokes being spaced circumferentially around a shaft, each spoke of the plurality of spokes having a first spoke end and a second spoke end, the each spoke of the plurality of spokes extending along an axis between the first spoke end and the second spoke end, the first spoke end coupled to the shaft and the second spoke end coupled to a blade of a plurality of blades, wherein each blade of the plurality of blades is a hemispherical-shaped cup with an open surface and coupled to the second spoke end with the open surface at a −20 to 750 angle to the axis;
   b) a dispenser comprising:
      a combustion chamber;
      an air injector coupled to the combustion chamber and configured to inject air of an air-fuel mixture into the combustion chamber;
      a fuel injector coupled to the combustion chamber and configured to inject fuel of the air-fuel mixture into the combustion chamber;
      an ignitor coupled to the combustion chamber and configured to supply a spark for combustion of the air-fuel mixture in the combustion chamber;
      a nozzle having a first nozzle end coupled to the combustion chamber and a second nozzle end positioned to direct discharged fluid after combustion in the combustion chamber toward the open surface of the blade to drive the turbine;
   c) a housing enclosing the second nozzle end and the plurality of blades, and having an exhaust pipe extending away from the shaft configured to direct the discharged fluid out of the housing; and
   d) a controller in communication with the dispenser and configured to control the air injector, the fuel injector and the ignitor, wherein the controller:
      receives, from a sensor, a signal indicating a position of at least one of the each blade of the plurality of blades;
      determines data including:
         a time for the dispenser to dispense the air and the fuel into the combustion chamber based on the position of the one blade;
         an amount of the air and an amount of the fuel for the dispenser to dispense into the combustion chamber based on the position of the one blade;
         a time for the ignitor to spark for igniting of the air-fuel mixture to cause combustion in the combustion chamber based on the position of the blade;
      and controls the air injector, the fuel injector and the ignitor based on the data.

2. The system of claim 1, further comprising:
   a plurality of magnets, each magnet of the plurality of magnets corresponding to the each spoke of the plurality of spokes of the turbine; and
   the sensor in a fixed position relative to the plurality of spokes, wherein the sensor is in communication with the controller.

3. The system of claim 1, further comprising:
   an air compressor coupled to the air injector, and configured to deliver the air to the air injector of the dispenser and into the combustion chamber; and
   a fuel pump coupled to the fuel injector, and configured to deliver the fuel to the fuel injector of the dispenser and into the combustion chamber.

4. The system of claim 1, wherein the shaft is coupled to a motor, generator, wheel, propeller or transmission system.

5. The system of claim 1, further comprising liquid coolant conduits coupled inside of the housing and configured to dissipate heat of the discharged fluid after combustion in the combustion chamber.

6. The system of claim 1, wherein the housing is circular or toroidal.

7. The system of claim 1, wherein a plurality of systems are coaxially coupled to the shaft.

8. The system of claim 1, further comprising:
a second system coupled to the shaft; and
a flywheel coupled to the shaft, the flywheel configured to rotate relative to the shaft and having a plurality of brake shoes configured to contact the flywheel to prevent the flywheel from rotating;
wherein the system is configured to rotate in a first direction relative to the shaft and the second system is configured to rotate in a second direction relative to the shaft.

9. A system comprising:
a) a turbine having a plurality of spokes, the plurality of spokes being spaced circumferentially around a shaft, each spoke of the plurality of spokes having a first spoke end and a second spoke end, the each spoke of the plurality of spokes extending along an axis between the first spoke end and the second spoke end, the first spoke end coupled to the shaft and the second spoke end coupled to a blade of a plurality of blades, wherein each blade of the plurality of blades is a hemispherical-shaped cup with an open surface and coupled to the second spoke end with the open surface at a −20° to 75° angle to the axis;
b) a plurality of dispensers being spaced circumferentially around the shaft, each dispenser of the plurality of dispensers comprising:
a combustion chamber;
an air injector coupled to the combustion chamber and configured to inject air of an air-fuel mixture into the combustion chamber;
a fuel injector coupled to the combustion chamber and configured to inject fuel of the air-fuel mixture into the combustion chamber;
an ignitor coupled to the combustion chamber and configured to supply a spark for combustion of the air-fuel mixture in the combustion chamber;
a nozzle having a first nozzle end coupled to the combustion chamber and a second nozzle end positioned to direct discharged fluid after combustion in the combustion chamber toward the open surface of the blade to drive the turbine;
c) a housing enclosing the second nozzle end and the plurality of blades, and having an exhaust pipe extending away from the shaft configured to direct the discharged fluid out of the housing; and
d) a controller in communication with the each dispenser of the plurality of dispensers and configured to control the air injector, the fuel injector and the ignitor.

10. The system of claim 9, further comprising:
a plurality of magnets, each magnet of the plurality of magnets corresponding to the each spoke of the plurality of spokes of the turbine; and
a sensor in a fixed position relative to the plurality of spokes, wherein the sensor is in communication with the controller.

11. The system of claim 10, wherein the controller:
receives, from the sensor, a signal indicating position of the each blade of the plurality of blades;
determines data including:
a time for the each dispenser of the plurality of dispensers to dispense air and fuel into the each dispenser of the plurality of dispensers based on the position of the each blade of the plurality of blades;
an amount of the air and an amount of the fuel for the each dispenser of the plurality of dispensers to dispense into the each dispenser of the plurality of dispensers based on the position of the each blade of the plurality of blades; a
time for the ignitor to spark for igniting of the air and the fuel in the each dispenser of the plurality of dispensers to cause combustion based on the position of the each blade of the plurality of blades; and
controls the plurality of dispensers based on the data.

12. The system of claim 9 further comprising:
a second system coupled to the shaft; and
a flywheel coupled to the shaft, the flywheel configured to rotate relative to the shaft and having a plurality of brake shoes configured to contact the flywheel to prevent the flywheel from rotating;
wherein the system is configured to rotate in a first direction relative to the shaft and the second system is configured to rotate in a second direction relative to the shaft.

13. The system of claim 9, further comprising:
liquid coolant conduits coupled inside of the housing and configured to dissipate heat of the discharged fluid; and
wherein the housing encloses all of the plurality of dispensers.

14. The system of claim 9, wherein the housing is circular or toroidal.

15. The system of claim 9, wherein a plurality of systems are coaxially coupled to the shaft.

* * * * *